(12) United States Patent
Kim et al.

(10) Patent No.: US 10,417,978 B2
(45) Date of Patent: Sep. 17, 2019

(54) LIQUID-CRYSTAL DISPLAY DEVICE

(71) Applicant: Samsung Display Co., Ltd., Yongin-si, Gyeonggi-do (KR)

(72) Inventors: Sung Man Kim, Seongnam-si (KR); Jun Ho Song, Seoul (KR); Tae Hyung Hwang, Seoul (KR)

(73) Assignee: Samsung Display Co., Ltd. (KR)

( * ) Notice: Subject to any disclaimer, the term of this patent is extended or adjusted under 35 U.S.C. 154(b) by 242 days.

(21) Appl. No.: 15/357,986

(22) Filed: Nov. 21, 2016

(65) Prior Publication Data

US 2017/0162140 A1   Jun. 8, 2017

(30) Foreign Application Priority Data

Dec. 2, 2015   (KR) .................. 10-2015-0170716

(51) Int. Cl.
*G09G 3/36*         (2006.01)
*G09G 3/20*         (2006.01)
(Continued)

(52) U.S. Cl.
CPC ..... *G09G 3/3614* (2013.01); *G02F 1/133707* (2013.01); *G02F 1/134336* (2013.01); *G02F 1/136286* (2013.01); *G09G 3/2003* (2013.01); *G09G 3/3677* (2013.01); *G09G 3/3688* (2013.01); *G02F 1/1368* (2013.01); *G02F 1/133512* (2013.01); *G02F 1/133514* (2013.01); *G02F 2201/121* (2013.01); *G02F 2201/123* (2013.01); *G02F 2203/04* (2013.01);
(Continued)

(58) Field of Classification Search
CPC ......... G02F 1/133512; G02F 1/133514; G02F 1/133707; G02F 1/134336; G02F 1/136286; G02F 1/1368; G02F 2201/121; G02F 2201/123; G02F 2203/04; G09G 2300/0426; G09G 2320/066; G09G 2330/021; G09G 3/2003; G09G 3/3614; G09G 3/3677; G09G 3/3688
See application file for complete search history.

(56) References Cited

U.S. PATENT DOCUMENTS 7,583,279 B2    9/2009  Brown Elliott et al.
8,405,803 B2 *  3/2013  Kim .................. G02F 1/134363
                                                          257/59
(Continued)

FOREIGN PATENT DOCUMENTS

KR   10-2015-0001168   1/2005
KR   10-0531415        11/2005
(Continued)

*Primary Examiner* — Afroza Chowdhury
(74) *Attorney, Agent, or Firm* — Innovation Counsel LLP

(57) ABSTRACT

A liquid-crystal display device is provided. The liquid-crystal display device includes super-pixels, each of the super-pixels including a first pixel, a second pixel and a third pixel arranged in a first row, and a fourth pixel arranged in a second row, and first and second data lines extending in a column direction, wherein a width of the fourth pixel is equal to a sum of widths of the first to third pixels, each of the first to fourth pixels is connected to one of the first and second data lines, each of the first data lines is disposed adjacent to one side of the first pixel, and each of the second data lines is disposed between the second pixel and the third pixel.

16 Claims, 21 Drawing Sheets

(51) Int. Cl.
*G02F 1/1362* (2006.01)
*G02F 1/1343* (2006.01)
*G02F 1/1337* (2006.01)
G02F 1/1335 (2006.01)
G02F 1/1368 (2006.01)

(52) U.S. Cl.
CPC ............... *G09G 2300/0426* (2013.01); *G09G 2320/066* (2013.01); *G09G 2330/021* (2013.01)

(56) References Cited

U.S. PATENT DOCUMENTS

| | | | | |
|---|---|---|---|---|
| 2008/0316413 | A1* | 12/2008 | Cho | G02F 1/134309 349/144 |
| 2010/0134728 | A1* | 6/2010 | Kim | G02F 1/134363 349/106 |
| 2011/0285950 | A1* | 11/2011 | Su | G02F 1/136286 349/139 |
| 2012/0092321 | A1* | 4/2012 | Lin | G02F 1/136213 345/211 |
| 2012/0099068 | A1* | 4/2012 | Tsai | G02F 1/134309 349/143 |
| 2014/0002758 | A1* | 1/2014 | Huang | G02B 3/14 349/15 |
| 2015/0187301 | A1* | 7/2015 | Yoon | G09G 3/36 345/88 |

FOREIGN PATENT DOCUMENTS

| | | |
|---|---|---|
| KR | 10-2006-0132122 | 12/2006 |
| KR | 10-2011-0008365 | 1/2011 |
| KR | 10-2011-0045484 | 5/2011 |

* cited by examiner

LIQUID-CRYSTAL DISPLAY DEVICE

This application is based on and claims priority to Korean Patent Application No. 10-2015-0170716, filed on Dec. 2, 2015 in the Korean Intellectual Property Office, the disclosure of which is incorporated herein in its entirety by reference.

BACKGROUND

1. Field of the Disclosure

The present disclosure relates to a liquid-crystal display (LCD) device.

2. Description of the Related Art

Liquid-crystal display (LCD) devices can be operated with lower voltage and thus consume less power, and can be used for mobile devices. For these reasons, LCD devices can find applications in a variety of fields including laptop computers, monitors, spaceships, aircrafts, etc.

Typically, an LCD device includes a display panel for displaying images by utilizing light transmittance of liquid crystals, and a backlight assembly for providing light to the display panel. The display panel includes pixels displaying different colors. By combining different colors displayed by the pixels, a desired color can be reproduced. Commonly, each of the pixels can emit light of one of red, green and blue (RGB) colors, and a variety of colors can be displayed by combining them.

In addition to the pixels emitting light of red, green and blue, pixels emitting light of white can be further disposed, so that transmittance and contrast ratio can be improved and power consumption can be reduced.

In order to increase transmittance, improve contrast ratio and reduce power consumption, a ratio of the area occupied by the pixels emitting light of white with respect to the area occupied by the pixels emitting light of red, green and blue has to be adjusted. If all of the pixels are arranged in a matrix, however, it is not possible to adjust the area occupied by the pixels emitting light of white color. Accordingly, what is required is a novel layout of pixels for overcoming the issue.

SUMMARY

Aspects of the present disclosure provide an LCD device allowing the area occupied by pixels emitting light of white color to be easily adjusted.

These and other aspects, embodiments and advantages of the present disclosure will become immediately apparent to those of ordinary skill in the art upon review of the Detailed Description and Claims to follow.

According to exemplary embodiments of the present disclosure, the area occupied by pixels emitting light of white color in a LCD device can be easily adjusted.

According to an exemplary embodiment of the inventive concept, there is provided a liquid-crystal display device. The liquid-crystal display device comprising, a plurality of super-pixels arranged in a first direction and a second direction intersecting the first direction, each of the plurality of super-pixels comprising a first pixel, a second pixel adjacent to a first side of the first pixel in the first direction, a third pixel adjacent to a first side of the second pixel in the first direction, and a fourth pixel adjacent to a first side of the first to third pixels in the second direction, and a plurality of first and second data lines extending in the second direction, wherein a width of the fourth pixel in the first direction is equal to a sum of widths of the first to third pixels in the first direction, each of the first to fourth pixels is connected to one of the first and second data lines, each of the first data lines is disposed adjacent to a second side of the first pixel in the first direction, and each of the second data lines is disposed between the second pixel and the third pixel.

The liquid-crystal display device may further include a plurality of first to third gate lines extending in the first direction; and a plurality of third data lines extending in the second direction, wherein each of the first gate lines is disposed adjacent to a second side of the first pixel in the second direction, each of the second gate line is disposed between the first pixel and the fourth pixel, each of the third gate line is disposed adjacent to a first side of the fourth pixel in the second direction, and the third data line is disposed adjacent to a first side of the third pixel in the first direction.

A first gate line of a super-pixel may correspond to a third gate line of another super-pixel adjacent to the first gate line in the second direction, and a third data line of a super-pixel corresponds to a first data line of another super-pixel adjacent to the third data line in the first direction.

The first pixel may be connected to a respective first data line and a respective second gate line, the second pixel may be connected to a respective second data line and a respective first gate line, the third pixel may be connected to a respective second data line and the second gate line, and the fourth pixel may be connected to the first data line and a respective third gate line.

Polarities of first to third data signals input to the first to third data lines, respectively, may be changed frame by frame.

The first pixel may be connected to a respective second data line and a respective second gate line, the second pixel may be connected to a respective first data line and a first gate line, the third pixel may be connected to the second data line and the first gate line, and the fourth pixel may be connected to a respective third data line and the second gate line.

The first data line and the second pixel may be connected to each other via a first connection line extending in the first direction, and the second data line and the first pixel may be connected to each other via a second connection line extending in the first direction.

Polarities of first to third data signals input to the first to third data lines, respectively, may remain the same in a frame.

According to another exemplary embodiment of the inventive concept, there is provided a liquid-crystal display device. The liquid-crystal display device comprising, a plurality of super-pixels arranged in a first direction and a second direction intersecting the first direction, each of the plurality of super-pixels comprising a first pixel, a second pixel adjacent to a first side of the first pixel in the first direction, a third pixel adjacent to a first side of the second pixel in the first direction, and a fourth pixel adjacent to a first side of the first to third pixels in the second direction, and a plurality of first and second data lines extending in the second direction, wherein each of the second data lines traverses a respective fourth pixel.

The first pixel may include a first pixel electrode receiving a data signal from a first data line or a second data line connected thereto, the fourth pixel may include a fourth pixel electrode receiving a data signal from a first data line or a second data line connected thereto, the first pixel electrode may include a first domain comprising a plurality of slits making a first angle with respect to a straight line extending in the first direction, and a second domain comprising a plurality of slits making a second angle with respect to the straight line, and the fourth pixel electrode may include a third domain comprising a plurality of slits making a third angle with respect to the straight line extending in the first direction, and a fourth domain comprising a plurality of slits forming a fourth angle with respect to the straight line.

The first angle, the second angle, the third angle and the fourth angle may be same. Initial orientations of alignment films disposed in the first to fourth domains may be the same.

The first angle and the second angle are same.

The third angle and the fourth angle may be same and greater than the first angle and the second angle.

An initial orientation of the first domain may be the same as that of the second domain, an initial orientation of the third domain may be the same as that of the fourth domain, and the initial orientation of the first domain may be different from that of the third domain.

Each of the second data lines may include a first line section that overlaps the fourth pixel and a second line section other than the first section, wherein the first line section may overlap a boundary between the third domain and the fourth domain.

A portion of each of the first and second data lines in a first domain may extend in parallel to the slits of the first domain, and a portion of each of the first and second data lines in a second domain may extend in parallel to the slits of the second domain. The first pixel may transmit light of a first wavelength band, the second pixel may transmit light of a second wavelength band, the third pixel transmits light of a third wavelength band, and the fourth pixel may transmit light of all wavelength bands.

According to another exemplary embodiment of the inventive concept, there is provided a liquid-crystal display device. The liquid-crystal display device includes a plurality of first, second and third pixels arranged successively in a first direction in odd-numbered rows; and a plurality of fourth pixels arranged in the first direction in even-numbered rows, wherein a length of the fourth pixel in the first direction may be substantially equal to sum of lengths of the first to third pixels in a first direction, and a number of the first pixels, a number of the second pixels, a number of the third pixels and a number of the fourth pixels may be equal to one another.

The liquid-crystal display device may further include a plurality of first data lines and a plurality of second data lines extending in a second direction perpendicular to the first direction, wherein the plurality of first data lines may be disposed adjacent to one side of the plurality of fourth pixel in the first direction, respectively, and the plurality of second data lines may be disposed between the plurality of second pixels and the plurality of third pixels in the first direction, respectively.

Each of the plurality of second data lines may traverse a respective fourth pixel.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present inventive concept will now be described more fully hereinafter with reference to the accompanying drawings, in which embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the inventive concept.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, preferred embodiments of the present inventive concept will be described in detail with reference to the accompanying drawings.

Figure 1:
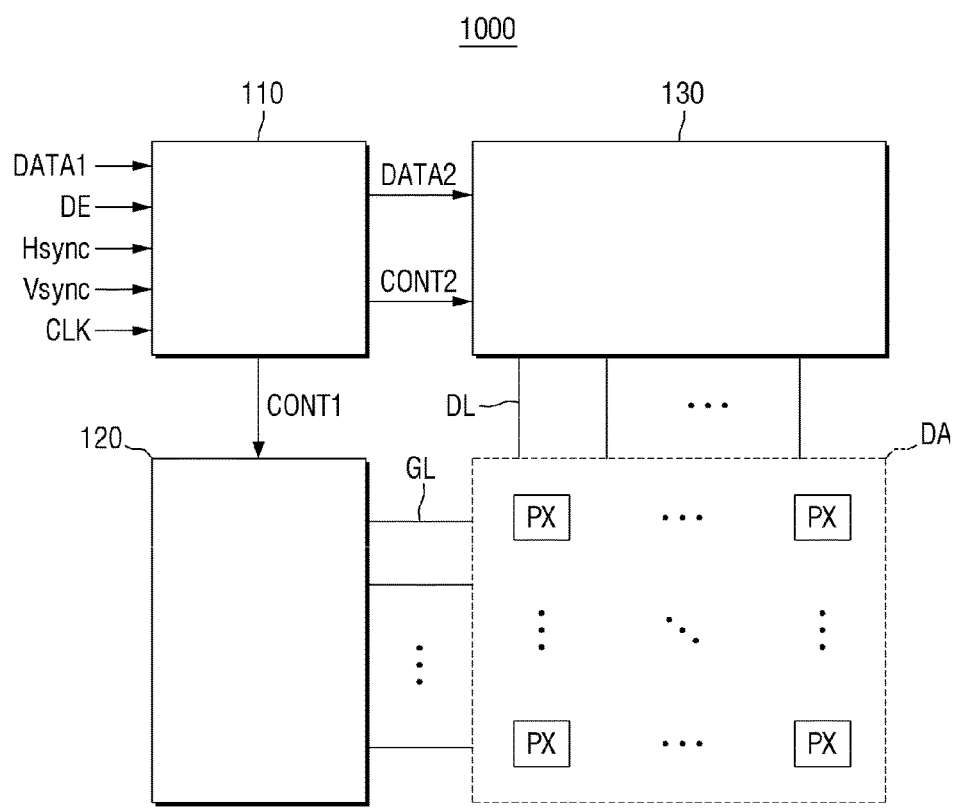
FIG. 1 is a block diagram of a liquid-crystal display (LCD) device according to an exemplary embodiment of the present disclosure.

FIG. 1 is a block diagram of a liquid-crystal display (LCD) device according to an exemplary embodiment of the present disclosure.

Referring to FIG. 1, the LCD device 1000 according to the exemplary embodiment of the present disclosure may include a gate driver 120, a data driver 130, a signal controller 110 and display area DA.

The display area DA includes a plurality of pixels PX. The plurality of pixels PX may be arranged in a matrix. The display area DA may include a plurality of gate lines GL extending in a first direction DR1, and a plurality of data lines DL extending in a second direction DR2 intersecting the first direction DR1.

The gate lines GL receive gate signals from the gate driver 120, and the data lines DL receive data signals from the date driver 130. The pixels PX may be disposed at intersections between the gate lines GL and the date lines DL.

Each of the pixels PX may display one of primary colors or white color for color reproduction. Examples of the primary colors may include red, green and blue. As used herein, a red pixel R refers to a pixel that emits red color light, a green pixel G refers to a pixel that emits green color light, a blue pixel B refers to a pixel that emits blue color light, and a white pixel W refers to a pixel that emits white color light. By combining the red pixel R, the green pixel G, the blue pixel B and the white pixel W and adjusting light intensity of each of them, other colors than red, green, blue and white can be displayed. Layout of each of the pixels in the display area will be described below.

The signal controller 110 receives a variety of signals from external elements and controls the gate driver 120 and the data driver 130. For example, the signal controller 110 may receive a first image data DATA1 and input control signals for controlling display of it, and may output a gate driver control signal CONT1, a data driver control signal CONT2, a second image data DATA2, etc.

The first image data DATA1 may contain brightness information on each of the pixels PX in the display area DA. The brightness information may have a predetermined number of gray levels, for example, 1,024 ($=2^{10}$), 256 ($=2^8$) or 64 ($=2^6$) gray levels. The input first image data DATA1 may be divided frame by frame.

The input control signal input to the signal controller 110 may include a vertical synchronization signal $V_{sync}$, a horizontal synchronization signal $H_{sync}$, a main clock signal $M_{clk}$ and a data enable signal DE, etc. However, this is not limiting and other types of signals may further be input to the signal controller 110.

The gate driver control signal CONT1 may be generated in the signal controller 110 for controlling the operation of the gate driver 120.

The gate driver control signal CONT1 may include, but is not limited to, a scan start signal, a clock signal, etc. The gate driver 120 may generate gate signals for activating the pixels PX in the display area DA in response to the gate driver control signal CONT1, and may provide each of the gate signals to the respective gate lines GL.

The data driver control signal CONT2 may be generated in the signal controller 110 for controlling the operation of the data driver 130. The data driver 130 may generate data signals in response to the data driver control signal CONT2, and may provide each of the data signals to the respective data lines DL.

Hereinafter, a structure of a pixel of the LCD device will be described in detail.

Figure 2:
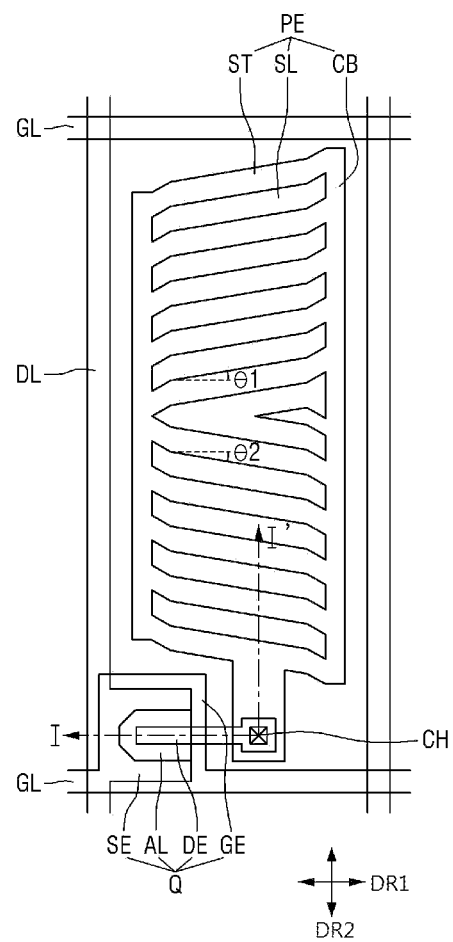
FIG. 2 is a layout diagram of a single pixel of a LCD device according to an exemplary embodiment of the present disclosure.
Figure 3:
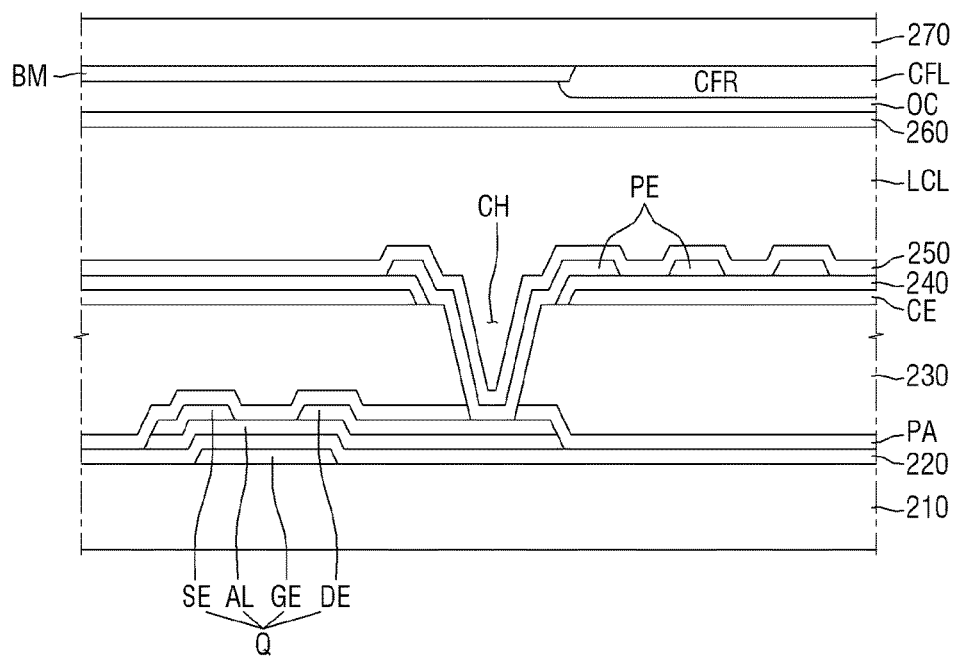
FIG. 3 is a cross-sectional view taken along line I-I' of FIG. 2.
Figure 4:
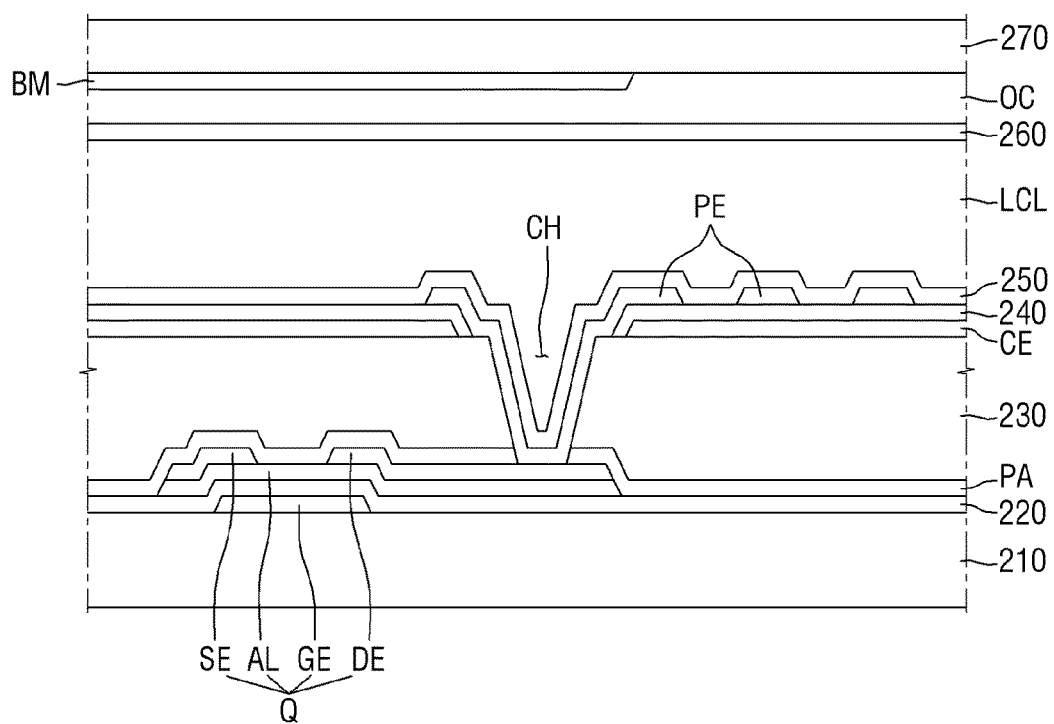
FIG. 4 is a cross-sectional view of a single pixel of an LCD device according to another exemplary embodiment of the present disclosure, taken along a line corresponding to line I-I' of FIG. 2.

FIG. 2 is a layout diagram of a single pixel of a LCD device according to an exemplary embodiment of the present disclosure. FIG. 3 is a cross-sectional view taken along line I-I' of FIG. 2. FIG. 4 is a cross-sectional view of a single pixel of an LCD device according to another exemplary embodiment of the present disclosure, taken along a line corresponding to line I-I' of FIG. 2.

Referring to FIGS. 2 and 3, an LCD device 1000 according to an exemplary embodiment of the present disclosure may include a first insulation substrate 210, a second insulation substrate 270 facing the first insulation substrate 100, and a liquid-crystal layer LCL disposed between the two substrates 210 and 270. For example, the first insulation substrate 210 may be a lower substrate and the second insulation substrate 270 may be an upper substrate.

Gate wires GL and GE are disposed on the first insulation substrate 210. The gate wires GL and GE may include a gate line GL extending in the first direction DR1 and a gate electrode GE connected to the gate line GL and overlapping a semiconductor layer AL.

The first insulation film 220 may be disposed on the gate wires GL and GE. The first insulation film 220 may be a gate insulation film made of silicon oxide or silicon nitride.

The semiconductor layer AL may be disposed on the first insulation film 220. The semiconductor layer AL may overlap some portions of the gate wires GL and GE. As described above, some portions of the gate wires GL and GE that overlap the semiconductor layer AL may be defined as the gate electrode GE. The semiconductor layer AL may include a semiconductor material such as amorphous silicon, polycrystalline silicon or oxide semiconductor, and may transmit or block electrical current depending on voltage applied to the gate electrode GE.

Although not shown in the drawings, in some embodiments, an ohmic contact element may be additionally disposed on the semiconductor layer AL. The ohmic contact element may be made of n+ hydrogenated amorphous silicon that is highly doped with n-type impurities, or may be made of silicide. The ohmic contact element (not shown) may provide ohmic contact between a source electrode SE and a drain electrode DE thereon and the semiconductor layer AL thereunder. In some embodiments where the semiconductor layer AL is made of an oxide semiconductor, the ohmic contact element may be eliminated.

Data wires DL, SE and DE may be disposed on the semiconductor layer AL and the first insulation film 220. The data wires may include a data line DL, a source electrode SE and a drain electrode DE.

The data line DL may extend in the second direction DR2 to intersect the gate line GL. A plurality of data lines may be disposed, spaced apart from one another.

The source electrode SE is connected to the data line DL and is disposed on the semiconductor layer AL. The drain electrode DE is disposed on the semiconductor layer AL and is spaced apart from the source electrode SE. When a gate-on voltage is applied to the gate electrode GE such that a channel is formed in the semiconductor layer AL, data voltage applied to the data line DL may be delivered to the drain electrode DE via the source electrode SE and the semiconductor layer AL.

A passivation layer PA may be disposed on the data wires DL, SE and DE, and the gate wires GL and GE. The passivation layer PA may be made of an organic insulative material or an inorganic insulative material and may cover a switching transistor Q formed by the source electrode SE, the drain electrode DE, the gate electrode GE and the semiconductor layer AL.

A first protective layer 230 may be disposed on the passivation layer PA. The first protective layer 230 may serve to provide a flat surface above the passivation layer PA. The first protective layer 230 may overlap all of the regions of the display area DA except for the region where a contact hole CH is formed. In addition, the first protective layer 230 may include an inorganic insulative material or an organic insulative material. The first protective layer 230 may have two or more films. For example, the first protective layer 230 may be formed by laminating an organic protective layer (not shown) made of an organic insulative material on an inorganic protective layer (not shown) made of an inorganic insulative material.

In the passivation layer PA and the first protective layer 230, the contact hole CH may be formed to expose a portion of the switching transistor Q, more specifically a portion of the drain electrode DE is exposed.

A common electrode CE may be disposed on the first protective layer 230. Like the first protective layer 230, the common electrode CE may be disposed in all of the regions of the display area DA except for the region where the contact hole CH is formed.

When common voltage is applied to the common electrode CE, the common electrode CE along with the pixel electrode PE may generate electric field across the liquid-crystal layer LCL.

A second protective layer 240 may be disposed on the common electrode CE. The second protective layer 240 may insulate the common electrode CE from another layer formed on the second protective layer 240, and may separate the common electrode CE from another layer formed on the second protective layer 240 by the thickness of the second protective layer 240.

A pixel electrode PE may be disposed on the second protective layer 240. The pixel electrode PE may be disposed in a pixel region. As used herein, each pixel region includes liquid-crystal molecules that are controlled at different timings according to different data signals.

The pixel electrode PE may include a plurality of stems ST spaced apart from one another, a plurality of slits SL, each of which is an opening between two stems ST, and a connecting bar CB connecting the stems ST to one another.

Some of stems ST of a pixel electrode PE in a pixel PX may be inclined so that they make a first angle θ1 that is an acute angle with respect to the first direction DR1 parallel to the gate line GL. The others of stems ST of the pixel electrode PE may be inclined so that they make a second angle θ2 that is an acute angle with respect to the first direction DR1. The absolute value of the first angle θ1 may be equal to that of the second angle θ2, and the first angle θ1 and the second angle θ2 may be symmetric to each other with respect to an imaginary line extending in the first direction DR1. This improves the viewing angle.

In addition, at the portions where the stems ST meet the connecting bar CB, a part of each of the stems ST may be inclined at a larger angle than the first and second angles θ1 and θ2 in the first direction DR1. This is to prevent texture from being visible. The texture may be formed on the portions where the stems ST meet the connecting bar CB and look darker than an intended brightness.

The pixel electrode PE and the common electrode CE together may form a liquid-crystal capacitor $C_{lc}$. The LCD device may further include a storage capacitor (not shown) connected to the pixel electrode PE. It is to be noted that the storage capacitor Cst may be eliminated as desired. In this exemplary embodiment, the storage capacitor Cst is eliminated.

A first alignment film 250 may be disposed on the pixel electrode PE. The first alignment film 250 may be a horizontal alignment film. For example, the first alignment film 250 may initially align liquid-crystal molecules LC in the adjacent liquid-crystal layer LCL in a particular orientation, and may induce a predetermined pretilt angle which is an angle formed between the first alignment film 250 and a long axis of the liquid-crystal molecules LC. That is, in the initial state where no electric field is applied between the pixel electrode PE and the common electrode CE, the liquid-crystal molecules LC in the liquid-crystal layer LCL disposed on the first alignment film 250 may be aligned such that they are oriented in a particular direction on the plane where the first alignment film 250 is formed, so that they are pretilted at 0.5° to 3°. However, the present disclosure is not limited thereto, and the first alignment film 250 may be a vertical alignment film.

If the LCD device 1000 according to the exemplary embodiment of the present disclosure is of a normally black mode type where the device displays black color in the initial state with no electric field formed between the pixel electrode PE and the common electrode CE, black color may be displayed as the first alignment film 250 aligns the liquid-crystal molecules LC in a particular orientation such that the liquid-crystal molecules LC and a polarizer plate (not shown) block light.

The second insulation substrate 270 may be disposed such that it faces the first insulation substrate 210. A light-shielding element BM may be disposed on the second insulation substrate 270, although shown as being under the second insulation substrate 270 in FIG. 3. The light-shielding element BM serves to block light and may be formed as a lattice. That is, the light-shielding element BM is disposed such that it overlaps the region where the pixel electrode PE is not disposed, thereby blocking light leakage.

A color filter layer CFL may be disposed on the second insulation substrate 270 and the light-shielding element BM. The color filter layer CFL may include a plurality of color filters CF. The color filters CF transmit a specific wavelength band of incident light while block other wavelength bands, so that light exiting them has a specific color.

For example, the color filter layer CFL may include a red color filter CFR transmitting light of a wavelength band corresponding to red light, a green color filter CFG transmitting light of a wavelength band corresponding to green light, a blue color filter CFB transmitting light of a wavelength band corresponding to blue light, and the like. The red color filter CFR may transmit light of a wavelength band from approximately 580 nm to 780 nm while absorb (and/or reflect) light of other wavelength bands. The green color filter CFG may transmit light of a wavelength band from approximately 450 nm to 650 nm while absorb light of other wavelength bands. The blue color filter CFB may transmit light of a wavelength band from approximately 380 nm to 560 nm while absorb light of other wavelength bands. The red color filter CFR may be made of a red pigment or a photosensitive organic material representing red color. The green color filter CFG may be made of a green pigment or a photosensitive organic material representing green color. The blue color filter CFB may be made of a blue pigment or a photosensitive organic material representing blue color.

The color filter layer CFL and the red, green and blue color filters CFR, CFG and CFB included therein may be disposed in each of the pixels, however, they may not be disposed in some pixels. In particular, in a white pixel W, an overcoat layer OC may be disposed in place of the red, green or blue color filter CF, as shown in FIG. 4. Accordingly, all of the wavelength bands are transmitted and thus white color can be perceived. However, this is merely illustrative. Alternatively, an additional transparent layer for transmitting all wavelength bands of light may be formed rather than the overcoat layer OC in place of the red, green or blue color filter CF.

It is to be noted that the light-shielding element BM and the color filter layer CFL are not necessarily disposed on the second insulation substrate 270 but may be disposed on the first insulation substrate 210. In the latter case, the color filter layer CFL may be disposed between an inorganic protective layer (not shown) and an organic protective layer (not shown) of the first protective layer 230. In some embodiments, the color filter layer CFL may be disposed in place of the first protective layer 230.

An overcoat layer OC may be disposed on the light-shield layer BM and the color filter layer CFL. The overcoat layer 250 may protect the color filter layer CFL and the light-shield element BM while providing a flat surface.

A second alignment film 260 may be disposed on the overcoat layer OC. The second alignment film 260 may be made of the same material and perform the same functionality as the first alignment film 250, and may be disposed at a different location. That is, like the first alignment film 250, the second alignment film 260 may initially align liquid-crystal molecules LC in the adjacent liquid-crystal layer LCL in a particular orientation, and may induce a predetermined pretilt angle.

The liquid-crystal layer LCL may be disposed between the first alignment film 250 of the first insulation substrate 210 and the second alignment film 260 of the second insulation substrate 270. The liquid-crystal layer LCL may include liquid-crystal molecules LC having dielectric anisotropy. The liquid crystal molecules LC may have positive dielectric anisotropy and may be aligned so that the major axis of each of the liquid-crystal molecules is parallel to the applied electric field. Alternatively, the liquid crystal molecules LC may have negative dielectric anisotropy and may be aligned so that the major axis of each of the liquid-crystal molecules is perpendicular to the applied electric field.

Once electric field is formed between the common electrode CE and the pixel electrode PE, adjacent liquid crystal molecules LC are reoriented in a particular direction. The polarization of light passing through the reoriented liquid crystal molecules LC changes according to optical anisotropy of the reoriented liquid-crystal molecules LC. In this manner, the light may be transmitted or blocked by polarizer plates (not shown) disposed on the first insulation substrate 210 and the second insulation substrate 270. As used herein, the term "reoriented" means that the liquid crystal molecules LC are "rotated" along the electric field formed between the common electrode CE and the pixel electrode PE.

Hereinafter, arrangement of pixels of the LCD device 1000 will be described in detail.

Figure 5:
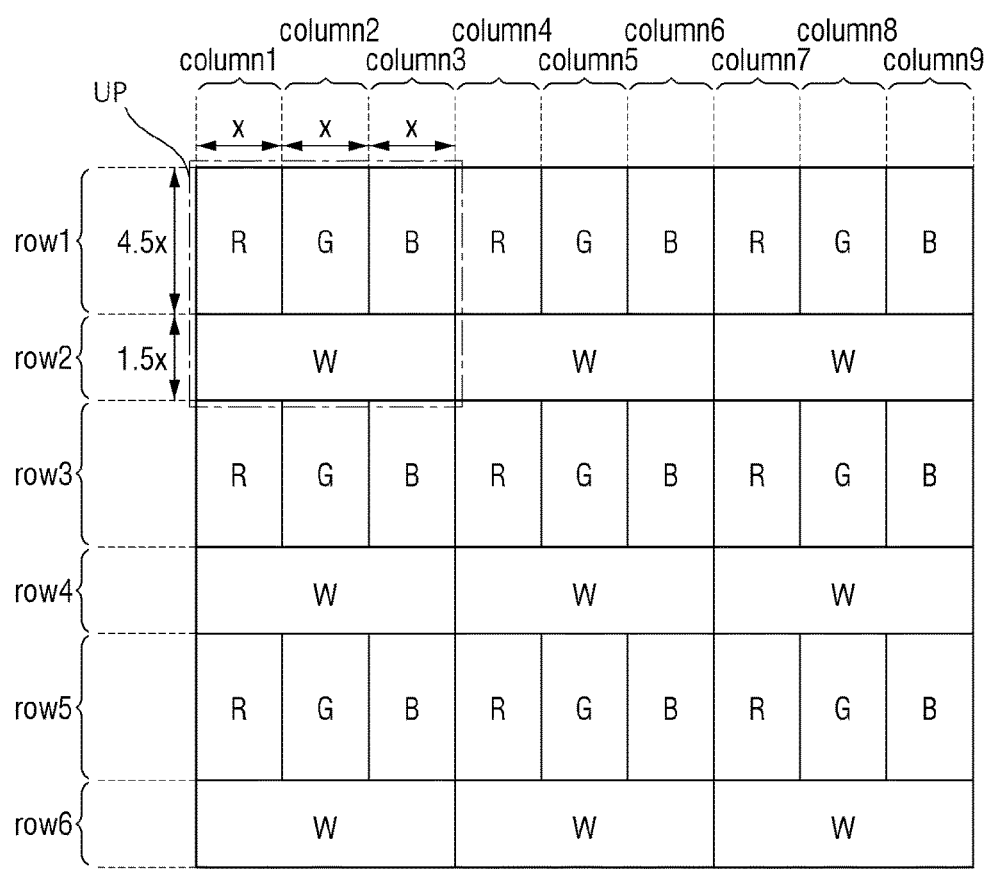
FIG. 5 is a layout diagram of some pixels arranged in a display area of an LCD device according to an exemplary embodiment of the present disclosure.

FIG. 5 is a layout diagram of some pixels arranged in a display area of an LCD device according to an exemplary embodiment of the present disclosure.

Referring to FIG. 5, in the display area DA, red pixels R, green pixels G, blue pixels B and white pixels W are arranged. In one row, for example, row1, a red pixel R, a green pixel G and a blue pixel B are arranged in this order repeatedly. In the next row, for example, row2, white pixels W are arranged. A white pixel W may be arranged such that it is adjacent to all of the red pixel R, the green pixel G and the blue pixel B arranged successively in the adjacent row.

That is, a red pixel R may be disposed in the first column of the first row, a green pixel G may be disposed in the second column of the first row, a blue pixel B may be disposed in the third column of the first row, and a white pixel W may be disposed across the first to third columns of the second row.

A set of four pixels, i.e., the red pixel R in the first column of the first row, the green pixel G in the second column of the first row, the blue pixel B in the third column of the first row, and the white pixel W across the first to third columns of the second row, may be defined as a super-pixel UP. A super-pixel UP may be a unit by which the red, green, blue and white colors emitted from the pixels therein are combined and perceived as a single color.

A super-pixel UP may include a red pixel R, a green pixel G, a blue pixel B and a white pixel W, and may be disposed across two rows. The width of the white pixel W disposed in the second row may be equal to the sum of widths of the red pixel R, the green pixel G and the blue pixel B in the row direction.

According to this exemplary embodiment, only white pixels W that do not emit light of a particular color but improve brightness or contrast ratio are disposed in a row, and red pixels R, green pixels G and blue pixels B are disposed in the next row, so that the length of the white pixels W in the column direction may be designed as desired. As a result, it is possible to adjust the contrast ratio as desired without decreasing the aperture ratio.

That is, even if the length of the white pixels W in the column direction is changed, the length of the red pixels R, the green pixels G and the blue pixels B in the column direction disposed in the other row remains the same, and thus the degree of design freedom can be increased. The lengths of the pixels in the row and column directions disposed in each of the rows may be different from one another.

For example, each of the pixels R, G and B disposed in a first row may extend in the row direction by the length of x, while each of the pixels W disposed in a second row may extend in the row direction by the length of 3x.

In addition, each of the pixels R, G and B disposed in the first row may extend in the column direction by the length of 4.5x, while each of the pixels W disposed in the second row may be extended in the column direction by the length of 1.5x.

For a super-pixel UP disposed across the first column to third column of the first row and first column to third column of the second row, each of a red pixel R, a green pixel G, a blue pixel B and a white pixel W occupies the same area, i.e., $4.5x^2$. As a result, each of the pixels equally contributes to the super-pixel UP.

Likewise, the pixels R, G, B and W disposed across the third to sixth rows may also be disposed such that they have the same lengths in the row and column directions as those in the first to second rows.

Since the length of the white pixels W in the column direction can be adjusted as desired as described above, the length is not limited to 1.5x but may be adjusted depending on design choice. Accordingly, the area of the white pixel W may have other value than 4.5x2.

Figure 6:
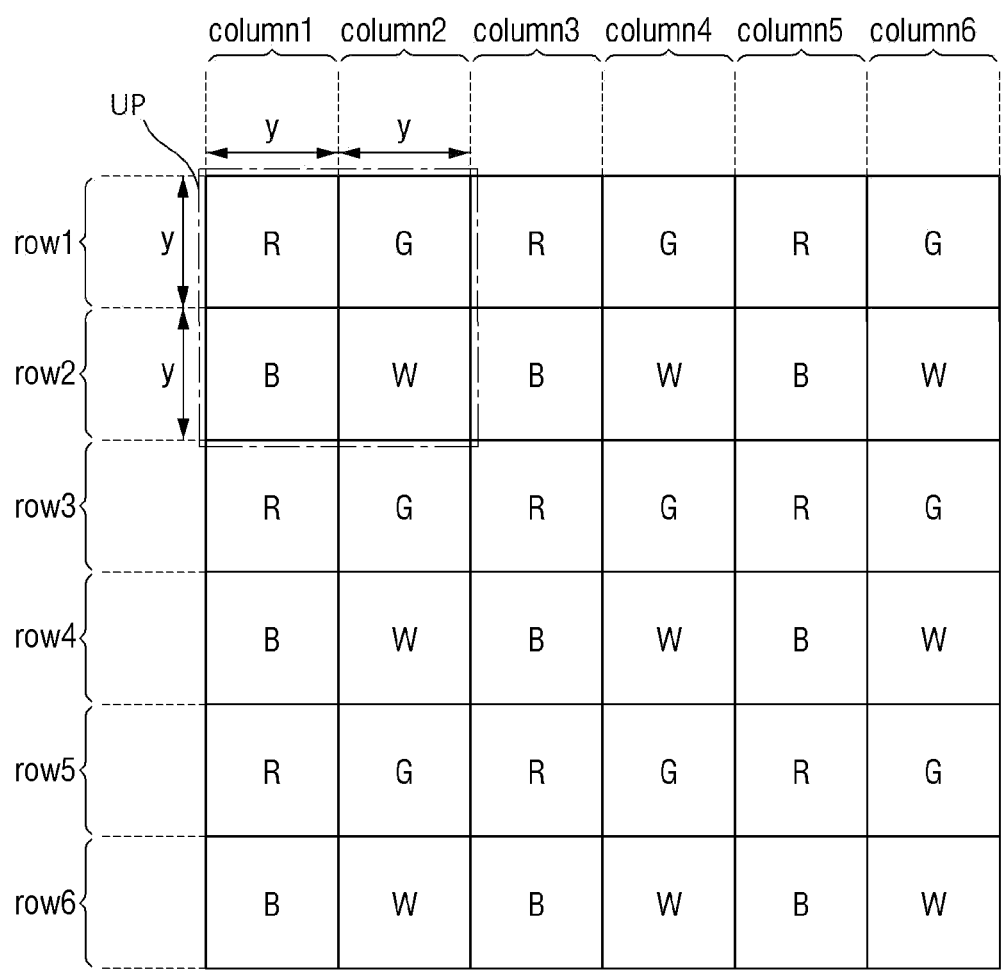
FIG. 6 is a diagram schematically showing some pixels arranged in a display area of an LCD device according to another exemplary embodiment.

FIG. 6 is a diagram schematically showing some pixels arranged in a display area of an LCD device according to another exemplary embodiment.

Referring to FIG. 6, in the display area, red pixels R, green pixels G, blue pixels B and white pixels W are arranged. Every pixel may have the same lengths in the row direction and column direction. For example, as shown in FIG. 6, A group of four pixels, i.e., the red pixel R in the first column of the first row, the green pixel Gin the second column of the first row, the blue pixel B in the second column of the first row, and the white pixel W in the second column of the second row, may form a super-pixel UP.

Unlike the pixels shown in FIG. 5, however, in the pixels in FIG. 6, it is not possible to adjust the area occupied by a white pixel W in a super-pixel UP without reducing transmittance.

Specifically, if a length of a white pixel W in the row direction or the column direction is changed, that of an adjacent pixel, which is not a white pixel, also has to be adjusted in order not to create a region where no color is displayed, which otherwise may reduce transmittance. For this reason, the area occupied by a white pixel W in a super-pixel UP cannot be independently adjusted as desired. Accordingly, the layout of the pixels shown in FIG. 5 is required.

Figure 7:
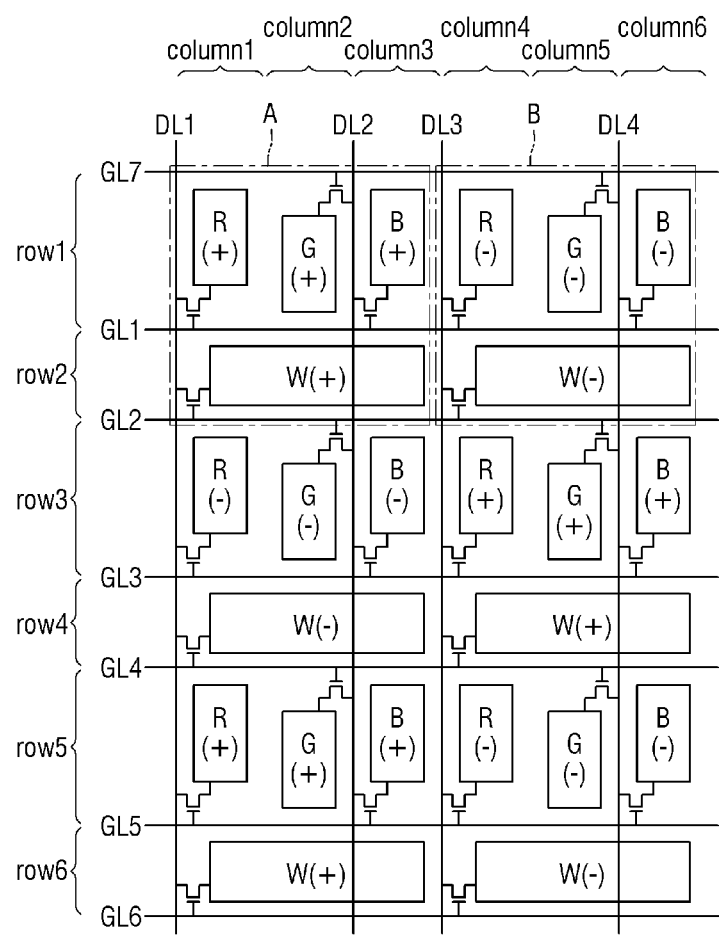
FIG. 7 is a diagram schematically showing connection between data lines and gate lines of the pixels shown in FIG. 5.

FIG. 7 is a diagram schematically showing connection between data lines and gate lines of the pixels shown in FIG. 5.

Although FIG. 5 shows the pixels disposed in nine columns, FIG. 7 only shows the pixels in six columns for convenience of illustration.

Referring to FIG. 7, data lines DL1 to DL4 are arranged in the row direction, and gate lines GL1 to GL7 are arranged in the column direction.

The first data line DL1 is disposed on the left side of the pixel disposed in the first column. The second data line DL2 is disposed on the left side of the pixel disposed in the third column. The third data line DL3 is disposed on the left side of the pixel disposed in the fourth column. The fourth data line DL4 is disposed on the left side of the pixel disposed in the sixth column.

That is, two data lines are disposed for every three successive pixel columns, one on the left side of the pixel in the first column and the other on the left side of the pixel in the third column.

In addition, for the gate lines GL1 to GL7 arranged in the column direction, the first gate line GL1 may be disposed on the lower side of the pixel in the first row, the second gate line GL2 may be disposed on the lower side of the pixel in the second row, the third gate line GL3 may be disposed on the lower side of the pixel in the third row, the fourth gate line GL4 may be disposed on the lower side of the pixel in the fourth row, the fifth gate line GL5 may be disposed on the lower side of the pixel in the fifth row, and the sixth gate line GL6 may be disposed on the lower side of the pixel in the sixth row.

The seventh gate line GL7 is depicted in FIG. 7 is an additional gate line as FIG. 7 shows some of the pixels in the display area DA. That is, the seventh gate line GL7 may be connected to the pixels in the first row and also to pixels (not shown) in another row on the upper side of the first row. That is, another super-pixel UP may be disposed on the upper side of the super-pixel UP indicated by dash-dot line A, and the seventh gate line GL7 may be a gate line disposed on the lower side of a white pixel W belonging to the another super-pixel UP. In addition, if the pixels in the first row are disposed at the uppermost end of the display area, the seventh gate line GL7 may be a gate line for driving only some of the pixels in the first row.

The red pixel R disposed in the first column of the first row may be connected to the first data line DL1 and the first gate line GL1, and a switching transistor Q for driving the pixel in the first column of the first row may be disposed on the lower left side of the pixel.

The green pixel G disposed in the second column of the first row may be connected to the second data line DL2 and the seventh gate line GL7, and a switching transistor Q for driving the pixel in the second column of the first row may be disposed on the upper right side of the pixel.

The blue pixel B disposed in the third column of the first row may be connected to the third data line DL3 and the first gate line GL1, and a switching transistor Q for driving the pixel in the third column of the first row may be disposed on the lower left side of the pixel.

The white pixel W disposed across the first column to the third column of the second row may be connected to the first data line DL1 and the second gate line GL2, and a switching transistor Q of the pixel may be disposed on the lower left side of the first column of the second row.

As described above, a set of pixels, i.e., the red pixel R in the first column of the first row, the green pixel G in the second column of the first row, the blue pixel B in the third column of the first row, and the white pixel W across the first to third columns of the second row, may form a super-pixel UP. Accordingly, two data lines and three gate lines may be required for driving a single super-pixel UP. Among the three gate lines of a single super-pixel UP, some gate lines may be shared by another super-pixel UP adjacent to the super-pixel UP, and thus actually two gate lines may be required for driving the super-pixel UP. Accordingly, when n super-pixels UP are arranged in the column direction, the number of gate lines required for driving the pixels may be equal to 2n+1.

When an image or video is displayed in the display area DA, the polarity of each of data signals input to the respective pixels may be inverted frame by frame, for improving display quality.

If all of the pixels disposed in the same row or column have the same polarity in a frame, a vertical line or horizontal line may be perceived along the respective row or column. In order to prevent this, according to this exemplary embodiment, if pixels included in a single super-pixel UP have positive polarity, pixels included in an adjacent super-pixel UP may have negative polarity. Likewise, if pixels included in a single super-pixel UP have negative polarity, pixels included in an adjacent super-pixel UP may have positive polarity. That is, dot-inversion driving may be performed super-pixel by super-pixel.

This may be performed by controlling connection between the data lines DL and the gate lines GL of the pixels and the polarity of data signals input to the data lines DL. More detailed descriptions thereof will be given with reference to FIG. 8.

Figure 8:
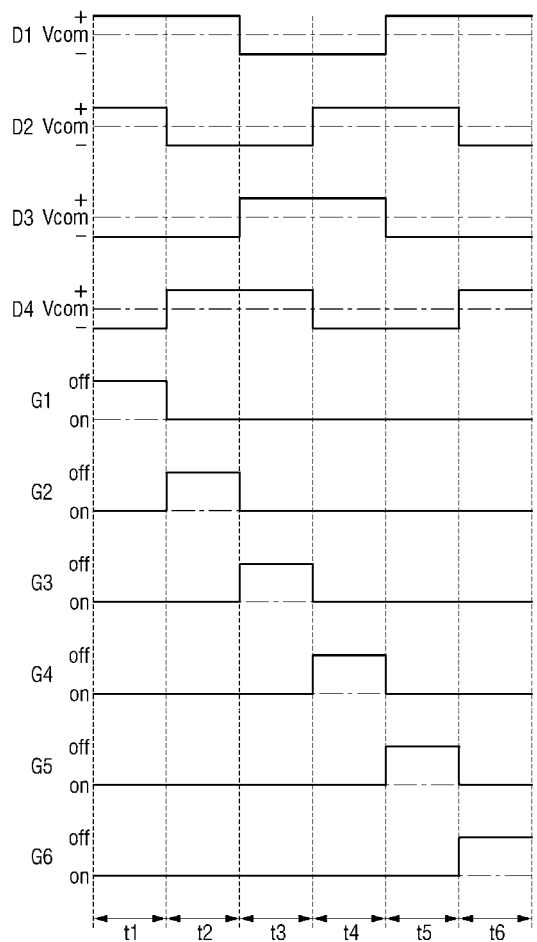
FIG. 8 shows a waveform diagram of signals input to the data lines and the gate lines shown in FIG. 7.

FIG. 8 shows a waveform diagram of signals input to the data lines and the gate lines shown in FIG. 7.

Referring to FIG. 8, the polarity of each of first to fourth data signals D1 to D4 input to the first to fourth data lines DL1 to DL4, respectively, changes at a regular period. In addition, each of first to sixth gate signals G1 to G6 input to the first to sixth gate lines GL1 to GL6, respectively, has on-level voltage at a predetermined time interval.

As used herein, the positive polarity refers to a voltage of a data signal larger than a common voltage applied to the common electrode. The negative polarity refers to a voltage of a data signal smaller than the common voltage.

In FIG. 8, all of the first to fourth data signals D1 to D4 are shown as having the same brightness values for the purpose of clearly distinguishing between the polarities. In practice, however, brightness values may differ from time interval to time interval, and thus actual voltage values may differ from those shown in FIG. 8. Even if the actual voltage values may differ from time interval to time interval, the polarities of the data signals may follow a certain rule at different time intervals, as will be described below.

Specifically, in the first time interval t1, the first gate signal G1 may have on-level voltage while the second to sixth gate signals G2 to G6 may have off-level voltage. At this time, the first and the second data signals D1 and D2 may have positive polarity while the third and fourth data signals D3 and D4 may have negative polarity. Subsequently, in the second time interval t2, the second gate signal G2 may have on-level voltage while the first and third to sixth gate signals G1 and G3 to G6 may have off-level voltage. At this time, the first and the fourth data signals D1 and D4 may have positive polarity while the second and third data signals D2 and D3 may have negative polarity.

Subsequently, in the third time interval t3, the third gate signal G3 may have on-level voltage while the first, second and fourth to sixth gate signals G1, G2 and G4 to G6 may have off-level voltage. At this time, the third and the fourth data signals D3 and D4 may have positive polarity while the first and second data signals D1 and D2 may have negative polarity.

Subsequently, in the fourth time interval t4, the fourth gate signal G4 may have on-level voltage while the first to third, fifth and sixth gate signals G1 to G3, G5 and G6 may have off-level voltage. At this time, the second and third data signals D2 and D3 may have positive polarity while the first and fourth data signals D1 and D4 may have negative polarity.

Subsequently, in the fifth time interval t5, the fifth gate signal G5 may have on-level voltage while the first to fourth and sixth gate signals G1 to G4 and G6 may have off-level voltage. At this time, the first and second data signals D1 and D2 may have positive polarity while the third and fourth data signals D3 and D4 may have negative polarity.

Subsequently, in the sixth time interval t6, the sixth gate signal G6 may have on-level voltage while the first to fifth gate signals G1 to G5 may have off-level voltage. At this time, the first and the fourth data signals D1 and D4 may have positive polarity while the second and third data signals D2 and D3 may have negative polarity.

That is, each of the first to sixth gate signals G1 to G6 may have on-level voltage in sequence in a predetermined time interval. The polarity of each of the data signals D1 to D4 may be changed at every two intervals. Based on the waveforms of the first to fourth data signals D1 to D4 and the first to sixth gate signals G1 to G6, it is possible to perform dot-inversion method on the pixels shown in FIG. 7 super-pixel by super-pixel.

According to this exemplary embodiment, each of the gate signals G1 to G6 has on-level voltage only in one time interval. However, it will be appreciated that each of the gate signals G1 to G6 may have on-level voltage in more than one time intervals, and that several gate signals may have on-level voltage simultaneously.

Figure 9:
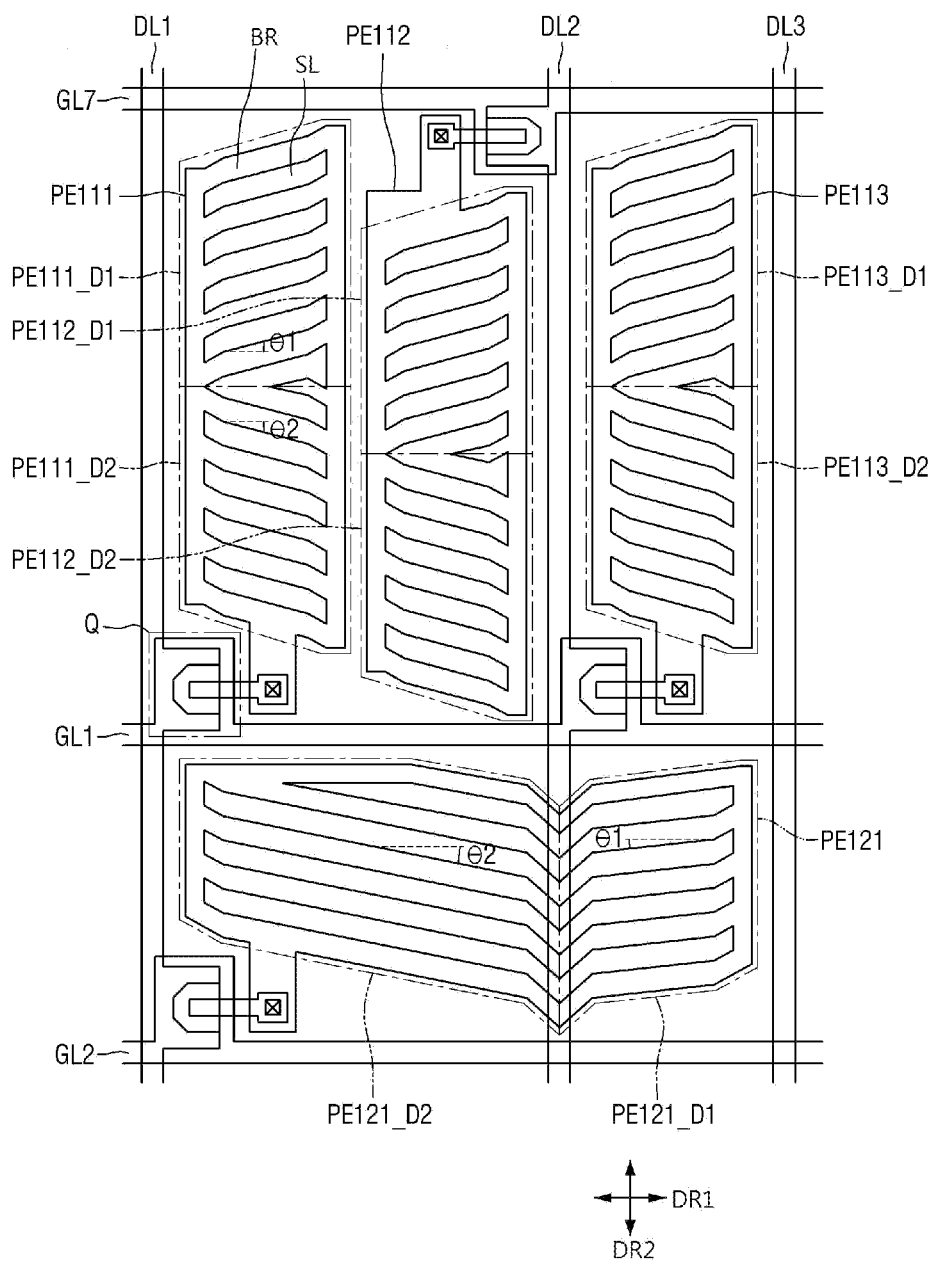
FIG. 9 is an enlarged plan view of portion A shown in FIG. 7.

FIG. 9 is an enlarged plan view of portion A shown in FIG. 7.

Referring to FIG. 9, the pixel electrode PE included in each of the pixels includes a plurality of domains each comprised of branches BR and slits SL inclined at different angles with respect to the first direction DR1.

Specifically, a first pixel electrode PE111 included in the first column of the first row may include a first domain PE111_D1 and a second domain PE111_D2. The slits SL and branches BR disposed in the first domain PE111_D1 make a first angle θ1 with respect to a straight line extending in the first direction DR1. The slits SL and branches BR disposed in the second domain PE111_D2 make a second angle θ2 with respect to the straight line extending in the first direction DR1. As described above, the absolute value of the first angle θ1 may be equal to that of the second angle θ2, and the first and second domains may be symmetric to each other with respect to the straight line extending in the first direction DR1. In addition, the area occupied by the first domain PE111_D1 may be equal to the area occupied by the second domain PE111_D2.

Specifically, a second pixel electrode PE112 included in the second column of the first row may include a third domain PE112_D1 and a fourth domain PE112_D2. The shapes of the branches BR and slits SL disposed in the third domain PE112_D1 may be the same as the shapes of the branches BR and slits SL disposed in the first domain PE111_D1. The shapes of the branches BR and slits SL disposed in the fourth domain PE112_D2 may be the same as the shapes of the branches BR and slits SL disposed in the second domain PE111_D2. That is, the second pixel electrode PE112 may have the same shape as the first pixel electrode PE111. In addition, the area occupied by the third domain PE112_D1 may be equal to the area occupied by the fourth domain PE112_D2.

Specifically, the third pixel electrode PE113 included in the third column of the first row may include a fifth domain PE113_D1 and a sixth domain PE113_D2. The shapes of the branches BR and slits SL disposed in the fifth domain PE113_D1 may be the same as the shapes of the branches BR and slits SL disposed in the first domain PE111_D1 and the third domain PE112_D1. The shapes of the branches BR and slits SL disposed in the sixth domain PE113_D2 may be the same as the shapes of the branches BR and slits SL disposed in the second domain PE111_D2 and the fourth domain PE112_D2. That is, the third pixel electrode PE113 may have the same shape as the first pixel electrode PE111 and the second pixel electrode PE112. In addition, the area occupied by the fifth domain PE113_D1 may be equal to the area occupied by the sixth domain PE113_D2.

Further, as shown in FIG. 9, the long axes of the first to third pixel electrodes PE111, PE112 and PE113 are parallel to the second direction DR2. On the other hand, the long axis of the fourth electrode PE121 disposed across the first to third columns of the second row is parallel to the first direction DR1. In addition, unlike the first to third pixel electrodes PE111, PE112 and PE113, a data line DL2 is disposed such that it overlaps the fourth pixel electrode PE121, so that the area of a domain PE121_D1 may be different from that of another domain PE121_D2 in the fourth pixel electrode PE121.

Specifically, the fourth pixel electrode PE121 may include the seventh domain PE121_D1 and the eighth domain PE121_D2. The shapes of the branches BR and slits SL disposed in the seventh domain PE121_D1 may be different from the shapes of the branches BR and slits SL disposed in each of the first, third and fifth domains PE111_D1, PE112_D1 and PE113_D1, but the angle made between the straight line extending in the first direction DR1 and the branches BR may be equal to the first angle θ1. In addition, the shapes of the branches BR and slits SL disposed in the eighth domain PE121_D2 may be different from the shapes of the branches BR and slits SL disposed in each of the second, fourth and sixth domains PE111_D2, PE112_D2 and PE113_D2, but the angle made between the straight line extending in the first direction DR1 and the branches BR may be equal to the second angle θ1. Accordingly, the initial orientations of the alignment films disposed on the first to fourth pixel electrodes PE111, PE112, PE113 and PE121 may be aligned to the first direction DR1.

The area occupied by the seventh domain PE121_D1 may be smaller than the area occupied by the eighth domain PE121_D2. The boundary between the seventh domain PE121_D1 and the eighth domain PE121_D2 may be disposed along the second data line DL2 overlapping the fourth pixel electrode PE121. Accordingly, it is possible to reduce decrease in the transmittance caused by the opaque second data line DL2.

Specifically, the orientations of liquid-crystal molecules LC are different from one another at the boundary between the first domain PE111_D1 and the second domain PE111_D2, at the boundary between the third domain PE112_D1 and the fourth domain PE112_D2, at the boundary between the fourth domain PE113_D1 and the sixth domain PE113_D2, and at the boundary between the seventh domain PE121_D1 and the eighth domain PE121_D2. As a result, the boundaries look darker, i.e., texture may show up. To reduce an influence of boundary effect, a portion of the fourth pixel electrode PE121 overlaps the second data line DL2 that is made of an opaque metal. Accordingly, it is possible to reduce decrease in the transmittance by disposing the boundary between the seventh domain PE121_D1 and the eight domain PE121_D2 on the second data line DL2 to overlap the second data line DL2 so that the darker areas overlap each other.

In addition, although not shown in the drawings, by forming a fourth pixel in portion B of FIG. 7 in which a domain corresponding to the seventh domain is disposed on the left side while a domain corresponding to the eighth domain is disposed on the right side, the assymetric structure of the domains of the fourth pixel PE121 can be offset. In this case, the second data line DL2 may be bent to overlap the boundary between the seventh domain on the left side of the fourth pixel in portion B and the eight domain on the right side of the fourth pixel in portion B.

The switching transistor Q of the pixel in the first column of the first row may be disposed on the lower left side of the first pixel electrode PE111 so as to be connected to the first data line DL1 and the first gate line GL1. The switching transistor Q of the pixel in the second column of the first row may be disposed on the upper right side of the second pixel electrode PE112 so as to be connected to the second data line DL2 and the seventh gate line GL7. The switching transistor Q of the pixel in the third column of the first row may be disposed on the lower left side of the third pixel electrode PE113 so as to be connected to the third data line DL3 and the first gate line GL1. In addition, the switching transistor of the pixel PE121 disposed across the first to third columns of the second row may be disposed on the lower left side of the fourth pixel electrode PE121 so as to be connected to the first data line DL1 and the second gate line GL2.

Figure 10:
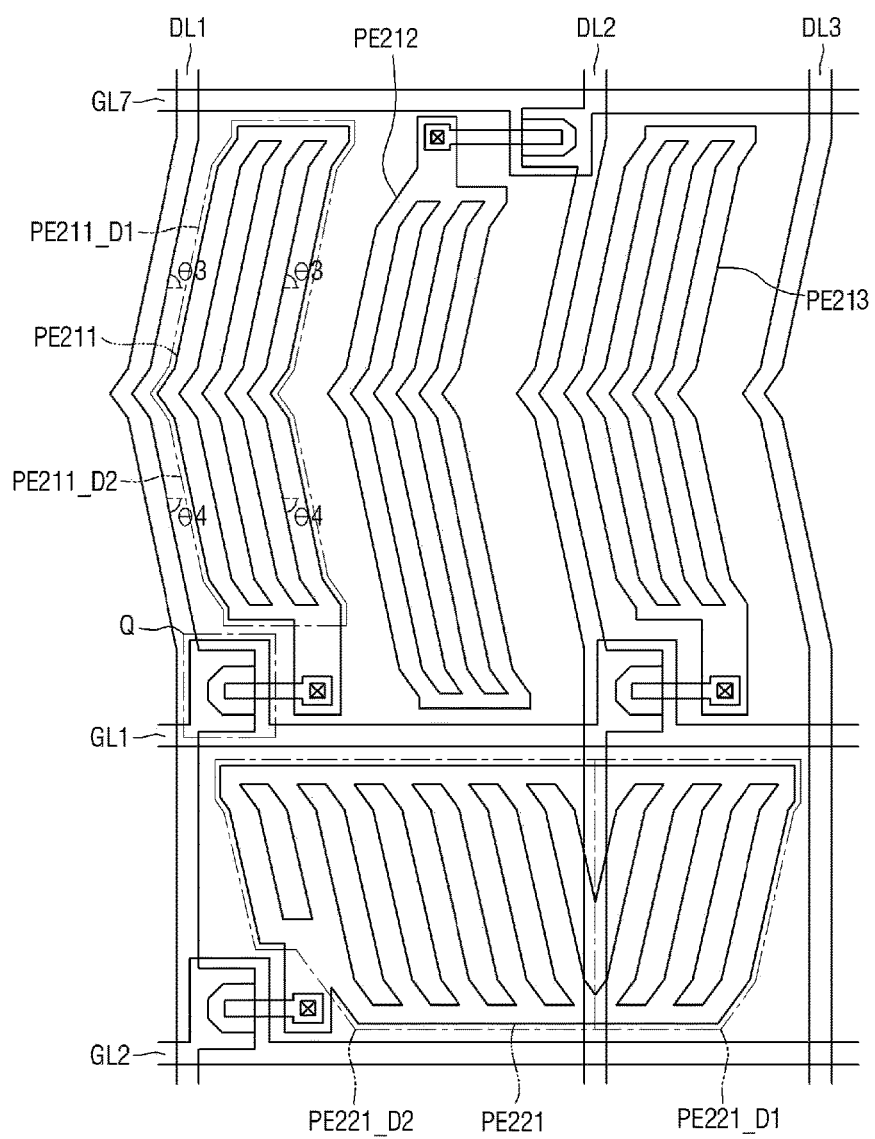
FIG. 10 is an enlarged plan view of a portion of an LCD device according to another exemplary embodiment of the present disclosure, which corresponds to portion A shown in FIG. 7.

FIG. 10 is an enlarged plan view of a portion of an LCD device according to another exemplary embodiment of the present disclosure, which corresponds to portion A shown in FIG. 7.

In the following description, the same or similar elements will be denoted by the same or similar reference numerals, and redundant descriptions will be omitted or briefly described.

Referring to FIG. 10, the pixel electrode PE included in each of the pixels includes a plurality of domains each comprised of branches BR and slits SL inclined at different angles with respect to the first direction DR1.

Specifically, a fifth pixel electrode PE211 included in the first column of the first row may include a ninth domain PE211_D1 and a tenth domain PE211_D2. The branches BR and slits SL disposed in the ninth domain PE211_D1 make a third angle θ3 with respect to a straight line extending in the first direction DR1. The branches BR and slits SL disposed in the tenth domain PE211_D2 make a fourth angle θ4 with respect to the straight line extending in the first direction DR1. The absolute value of the third angle θ3 may be equal to that of the fourth angle θ4, and the ninth and tenth domains may be symmetric to each other with respect to the straight line extending in the first direction DR1.

Unlike the embodiment shown in FIG. 9 where the long axes of the branches BR and slits SL included in each of the pixel electrodes PE111, PE112, PE113 and PE121 are disposed along a direction to have a first angle (θ1, θ2) with the first direction DR1, the long axes of the branches BR and slits SL included in each of the pixel electrodes PE211, PE212, PE213 and PE221 according to this exemplary embodiment may be disposed along a direction to have a second angle (θ3, θ4) which is greater than the first angle with the first direction DR1. Accordingly, the absolute values of the third angle θ3 and the fourth angle θ4 may be larger than those of the first angle θ1 and the second angle θ2 shown in FIG. 9.

In addition, the sixth pixel electrode PE212 in the second column of the first row and the seventh pixel electrode PE213 in the third column of the first row may have the same shape as the fifth pixel electrode PE211.

The eighth pixel electrode PE221 included in the pixel formed across the first to third columns of the second row may include an eleventh domain PE221_D1 and a twelfth domain PE221_D2. The shapes of the branches BR and slits SL disposed in the eleventh domain PE221_D1 may be different from the shapes of the branches BR and slits SL disposed in the ninth domain PE211_D1, but the angle made between the straight line extending in the first direction DR1 and the branches BR may be equal to the third angle θ3. Further, the shapes of the branches BR and slits SL disposed in the twelfth domain PE221_D2 may be different from the shapes of the branches BR and slits SL disposed in the tenth domain PE211_D2, but the angle made between the straight line extending in the first direction DR1 and the branches BR may be equal to the fourth angle θ4. Accordingly, the initial orientations of the alignment films disposed on the fifth to eighth pixel electrodes PE211, PE212, PE213 and PE221 may be aligned to have a predetermined angle with the second direction DR2.

Since the long axes of the branches BR and the slits SL included in each of the fifth to seventh pixel electrodes PE211, PE212 and PE213 extend along a direction to have the predetermined angle with the second direction DR2, the overall shape of the pixel electrodes may not be parallel to the second direction DR2 and may be inclined the predetermined angle with respect to the second direction DR2. In this case, all of the pixel electrode PE211, PE212 and PE213 of the pixels disposed in the first row are inclined at the same angle with respect to the second direction DR2, and thus the data lines DL1, DL2 and DL3 disposed between the pixel electrodes PE211, PE212 and PE213 may also be inclined with respect to the second direction DR2. That is, the data lines DL1, DL2 and DL3 substantially extending in the second direction DR2 may be inclined such that they make a third angle or a fourth angle with respect to the first direction DR1 at the area where they are adjacent to the pixel electrodes disposed in the first row. By doing so, the area where no pixel electrode is disposed is reduced, so that transmittance can be improved.

Figure 11:
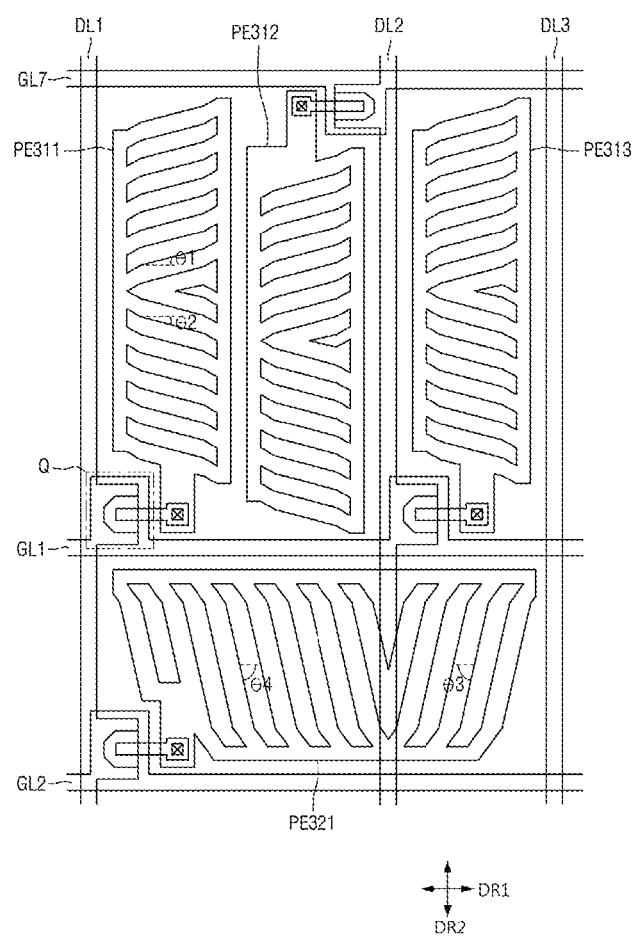
FIG. 11 is an enlarged plan view of a portion of an LCD device according to another exemplary embodiment of the present disclosure, which corresponds to portion A shown in FIG. 7.

FIG. 11 is an enlarged plan view of a portion of an LCD device according to another exemplary embodiment of the present disclosure, which corresponds to portion A shown in FIG. 7.

Referring to FIG. 11, the pixel electrode included in each of the pixels includes a plurality of domains each comprised of branches BR and slits SL inclined at different angles with respect to the first direction DR1.

Unlike the exemplary embodiments shown in FIGS. 9 and 10, the long axes of the branches BR and the slit SL included in each of the ninth pixel electrode PE311 of the pixel in the first column of the first row, the tenth pixel electrode PE312 of the pixel in the second column of the first row and the eleventh pixel electrode PE313 of the pixel in the third column of the first row may extend in a direction to have a predetermined angle with the first direction DR1, while the long axes of the branches BR and the slit SL included in the twelfth pixel electrode PE321 disposed across first to third columns of the second rows extend in a direction to have a predetermined angle with the second direction DR2.

In this case, the direction in which the long axes of the branches BR and the slits SL extend differ from row to row, the initial orientations of the alignment films may be different from one another. Specifically, the alignment film may be initially oriented along a direction to have a first predetermined angle with the first direction DR1 in the region where the ninth to eleventh pixel electrodes PE311, PE312 and PE313 of the pixels disposed in the first row are disposed, and the alignment film may be initially oriented along a direction to have a second predetermined angle which is greater than the first predetermined angle with the first direction DR1 in the region where the twelfth pixel electrode PE321 of the pixels disposed in the second row is disposed.

Since different initial orientations of the alignment films are required for different pixel rows, photoalignment process may be performed. Such photoalignment processes are well known in the art; and, therefore, description thereof will not be made.

Consequently, the branches BR and the slits SL included in each of the ninth to eleventh pixel electrodes PE311, PE312 and PE313 may make the first angle θ1 or the second angle θ2 with respect to the straight line extending in the first direction DR1, and the branches BR and the slits SL included in the twelfth pixel electrodes PE321 may make the third angle θ3 or the fourth angle θ4 with respect to the straight line extending in the first direction DR1. It will be appreciated that the first and second angles may be changed with the third and fourth angles. Accordingly, a variety of angles may be made between the pixel electrodes disposed in the display area and the straight line extending in the first direction DR1, thereby improving the display quality of the LCD device 1000.

Figure 12:
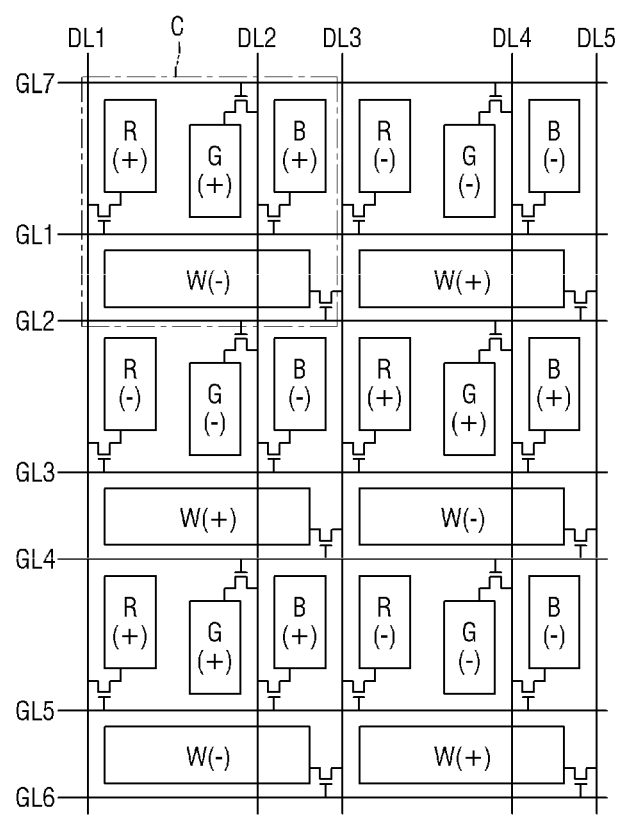
FIG. 12 is a diagram schematically showing connection between data lines and gate lines of the pixels shown in FIG. 5 according to another exemplary embodiment of the present disclosure.
Figure 13:
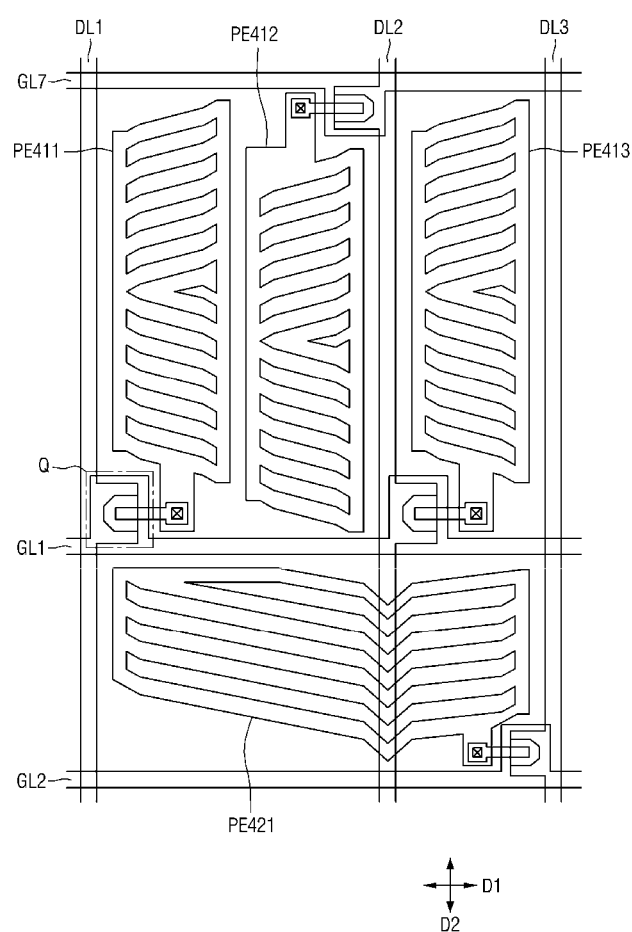
FIG. 13 is an enlarged plan view of portion C shown in FIG. 12.

FIG. 12 is a diagram schematically showing connection between data lines and gate lines of the pixels shown in FIG. 5 according to another exemplary embodiment of the present disclosure. FIG. 13 is an enlarged plan view of portion C shown in FIG. 12.

Referring to FIG. 12, data lines DL1 to DL5 are arranged in the row direction, and gate lines GL1 to GL7 are arranged in the column direction.

Unlike the exemplary embodiment shown in FIG. 7, a white pixel W disposed across the first column to the third column of the second row may be connected to a third data line DL3 and a second gate line GL2, and a switching transistor Q of the pixel may be disposed on the lower right side of the second column of the second row.

When the waveforms of the data signals D1 to D4 and the gate signals G1 to G6 as shown in FIG. 6 are input, dot-inversion method may be performed. Unlike the exemplary embodiment shown in FIG. 7 where the white pixels W have the same polarity as that of each of the red pixel R, the green pixel G and the blue pixel B disposed on the upper side thereof, the white pixels W according to the exemplary embodiment shown in FIG. 12 have the same polarity as that of each of the red pixel R, the green pixel G and the blue pixel B disposed on the lower side thereof.

Figure 14:
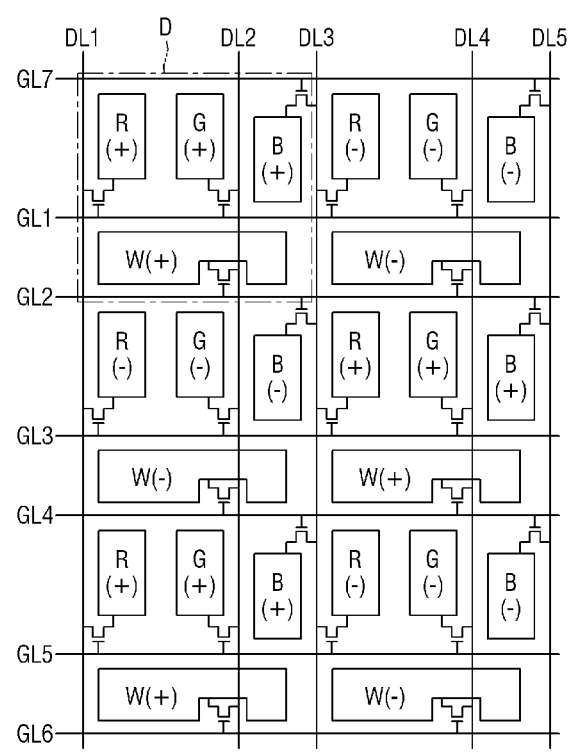
FIG. 14 is a diagram schematically showing connection between data lines and gate lines of the pixels shown in FIG. 5 according to another exemplary embodiment of the present disclosure.
Figure 15:
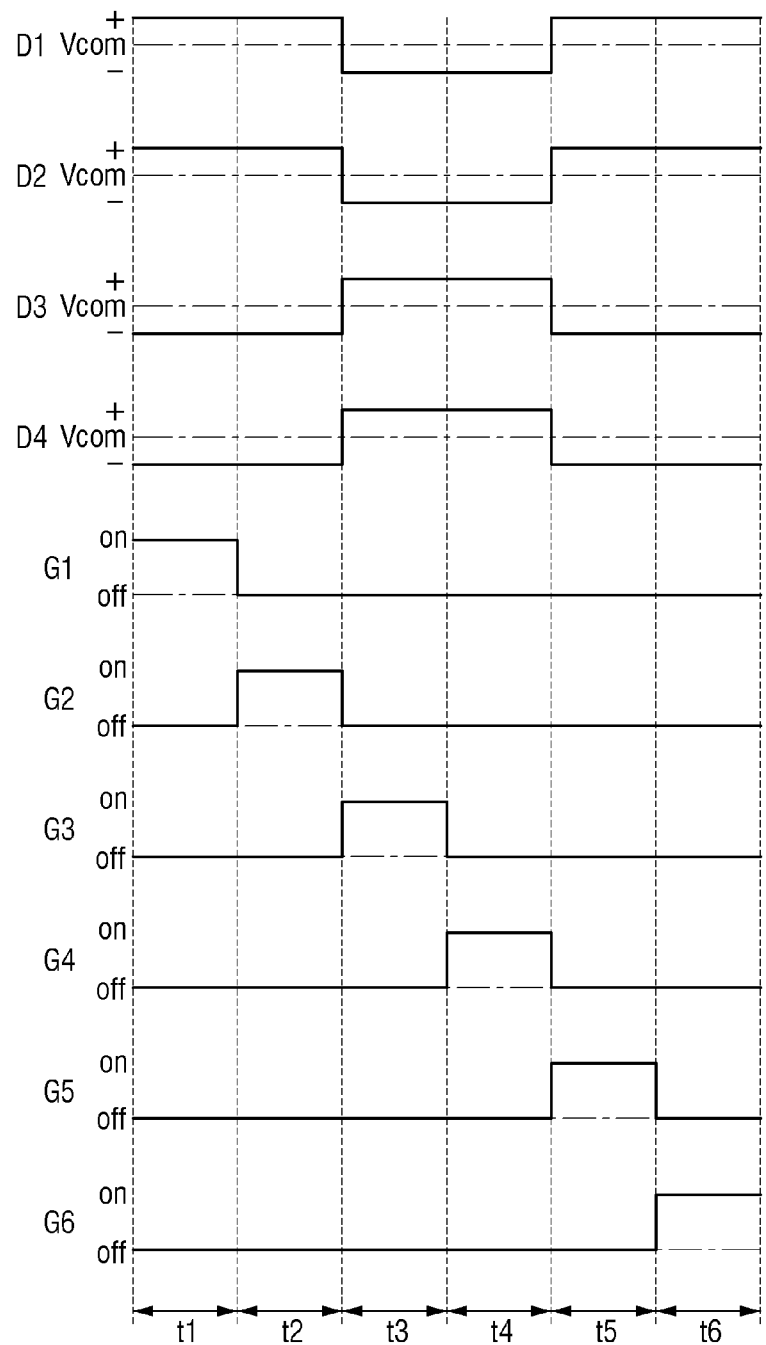
FIG. 15 shows a waveform diagram of signals input to the data lines and the gate lines shown in FIG. 14.
Figure 16:
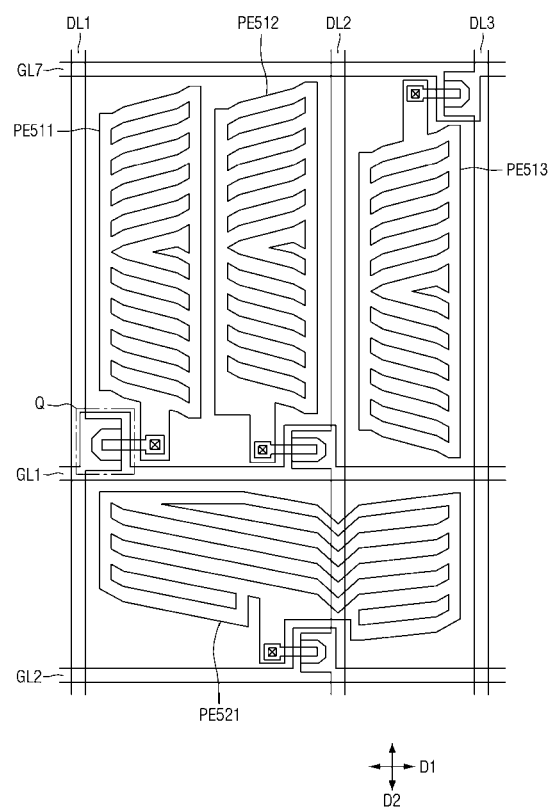
FIG. 16 is an enlarged plan view of portion D shown in FIG. 14.

FIG. 14 is a diagram schematically showing connection between data lines and gate lines of the pixels shown in FIG. 5 according to another exemplary embodiment of the present disclosure. FIG. 15 shows a waveform diagram of signals input to the data lines and the gate lines shown in FIG. 14. FIG. 16 is an enlarged plan view of portion D shown in FIG. 14.

Referring to FIG. 14, data lines DL1 to DL3 are arranged in the row direction, and gate lines GL1, GL2 and GL7 are arranged in the column direction.

The red pixel R disposed in the first column of the first row may be connected to the first data line DL1 and the first gate line GL1, and a switching transistor Q for driving the pixel in the first column of the first row may be disposed at the lower left side of the pixel.

The green pixel G disposed in the second column of the first row may be connected to the second data line DL2 and the first gate line GL1, and a switching transistor Q for driving the pixel in the second column of the first row may be disposed on the lower right side of the pixel.

The blue pixel B disposed in the third column of the first row may be connected to the third data line DL3 and the seventh gate line GL7, and a switching transistor Q for driving the pixel in the third column of the first row may be disposed on the upper right side of the pixel.

The white pixel W disposed across the first column to the third column of the second row may be connected to the second data line DL2 and the second gate line GL2, and a switching transistor Q of the pixel may be disposed close to a corner in which the second gate line GL2 and the second data line DL2 intersect.

In order to perform dot-inversion method on the super-pixels UP shown in FIG. 14, the waveforms of the first to fourth data signals D1 to D4 and the first to sixth gate signals G1 to G6 may be determined as described below.

Referring to FIG. 15, in the first time interval t1, the first gate signal G1 may have on-level voltage while the second to sixth gate signals G2 to G6 may have off-level voltage. At this time, the first and second data signals D1 and D2 may have positive polarity while the third and fourth data signals D3 and D4 may have negative polarity.

Subsequently, in the second time interval t2, the second gate signal G2 may have on-level voltage while the first and third to sixth gate signals G1 and G3 to G6 may have off-level voltage. At this time, the first and second data signals D1 and D2 may have positive polarity while the third and fourth data signals D3 and D4 may have negative polarity.

Subsequently, in the third time interval t3, the third gate signal G3 may have on-level voltage while the first, second and fourth to sixth gate signals G1, G2 and G4 to G6 may have off-level voltage. At this time, the third and the fourth data signals D3 and D4 may have positive polarity while the first and second data signals D1 and D2 may have negative polarity.

Subsequently, in the fourth time interval t4, the fourth gate signal G4 may have on-level voltage while the first to third, fifth and sixth gate signals G1 to G3, G5 and G6 may have off-level voltage. At this time, the third and the fourth data signals D3 and D4 may have positive polarity while the first and second data signals D1 and D2 may have negative polarity.

Subsequently, in the fifth time interval t5, the fifth gate signal G5 may have on-level voltage while the first to fourth and sixth gate signals G1 to G4 and G6 may have off-level voltage. At this time, the first and second data signals D1 and D2 may have positive polarity while the third and fourth data signals D3 and D4 may have negative polarity.

Subsequently, in the sixth time interval t6, the sixth gate signal G6 may have on-level voltage while the first to fifth gate signals G1 to G5 may have off-level voltage. At this time, the first and second data signals D1 and D2 may have positive polarity while the third and fourth data signals D3 and D4 may have negative polarity.

Based on the waveforms of the first to fourth data signals D1 to D4 and the first to sixth gate signals G1 to G6, it is possible to perform dot-inversion method on the pixels shown in FIG. 14 super-pixel by super-pixel.

The dot-inversion method may be performed on the connection between the gate lines and data lines according to the exemplary embodiment shown in FIG. 14 in the same manner as in FIG. 7. The waveforms shown in FIG. 15 is different from the waveforms of the signals input to the data lines and gate lines shown in FIG. 8 in that the polarities of the first to fourth data signals are changed at different timings in FIG. 8. In contrast, according to this exemplary embodiment, as shown in FIG. 15, the polarity of the first data signal D1 input to the first data line DL1 is changed at the same timing as the polarity of the second data signal D2 input to the second data line DL2 is changed. In addition, the polarity of the third data signal D3 input to the third data line DL3 is changed at the same timing as the polarity of the fourth data signal D4 input to the fourth data line DL4 is changed As a result, the data signals input to the respective data lines can be more easily controlled.

For the white pixels W, the switching transistor Q may be disposed close to a corner in which the second gate line GL2 and the second data line DL2 intersect. The pixel electrode of the white pixel W may have the shape shown in FIG. 16. It will be appreciated that the shape of the slits and branches included in the pixel electrode or the like may be modified as described above with respect to the exemplary embodiments.

Figure 17:
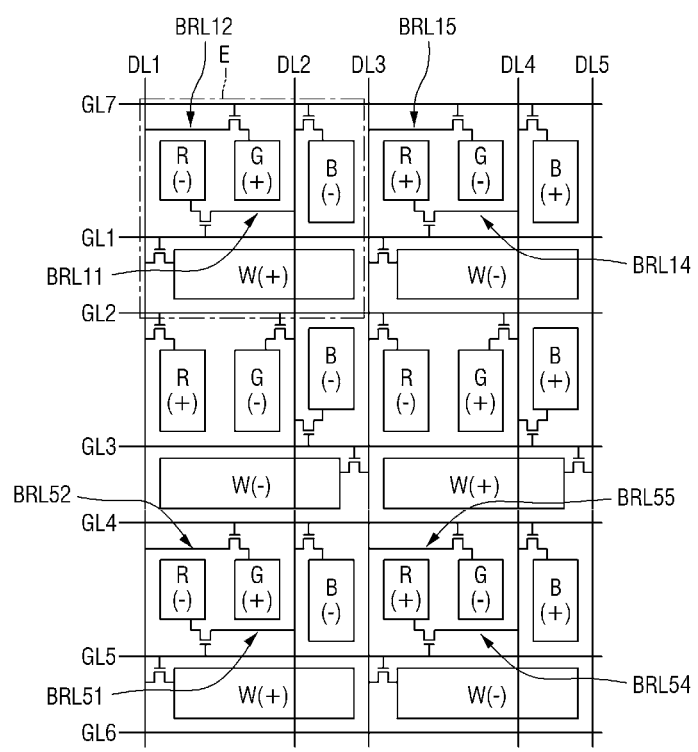
FIG. 17 is a diagram schematically showing connection between data lines and gate lines of the pixels shown in FIG. 5 according to another exemplary embodiment of the present disclosure.
Figure 18:
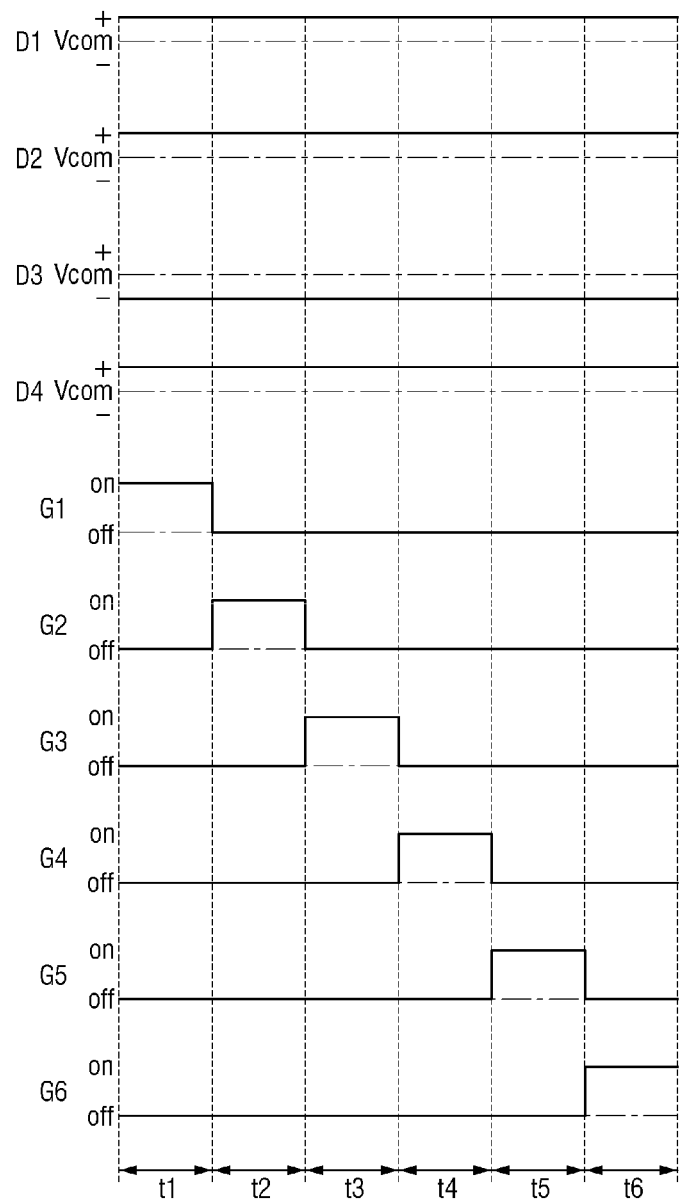
FIG. 18 shows a waveform diagram of signals input to the data lines and the gate lines shown in FIG. 17.
Figure 19:
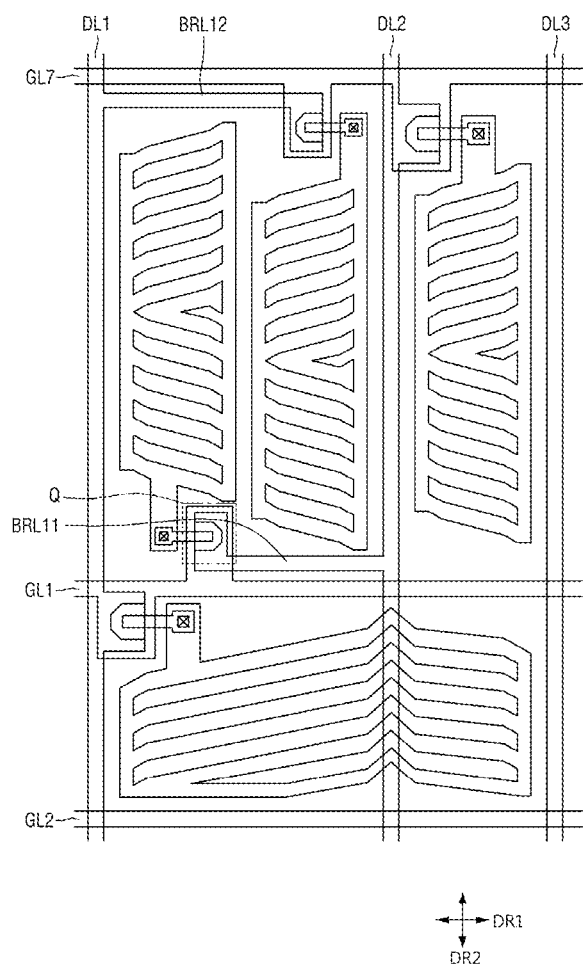
FIG. 19 is an enlarged plan view of portion E shown in FIG. 17.

FIG. 17 is a diagram schematically showing connection between data lines and gate lines of the pixels shown in FIG. 5 according to another exemplary embodiment of the present disclosure. FIG. 18 shows a waveform diagram of signals input to the data lines and the gate lines shown in FIG. 17. FIG. 19 is an enlarged plan view of portion E shown in FIG. 17.

Referring to FIG. 17, data lines DL1 to DL5 are arranged in the row direction, and gate lines GL1 to GL7 are arranged in the column direction.

The red pixel R disposed in the first column of the first row may be connected to the second data line DL2 and the first gate line GL1, and a switching transistor Q for driving the pixel in the first column of the first row may be disposed at the lower side of the pixel. In this case, a green pixel G in the second column of the first row is disposed between the red pixel R in the first column of the first row and the second data line DL2. Accordingly, a first connection line BRL11 extending in a direction parallel to the adjacent gate line GL1 may be disposed for connecting the second data line DL2 to the red pixel R in the first column of the first row. The second data signal supplied to the second data line DL2 may be supplied to a switching transistor Q in the first column of the first row via a first connection line when a first gate signal supplied to the first gate line GL1 is at on-level.

The green pixel G disposed in the second column of the first row may be connected to the first data line DL1 and the seventh gate line GL7, and a switching transistor Q for driving the pixel in the second column of the first row may be disposed on the upper side of the pixel. In this case, the red pixel R in the first column of the first row is disposed between the green pixel G in the second column of the first row and the first data line DL1. Accordingly, a second connection line BRL12 extending in the direction parallel to the adjacent gate line GL7 may be disposed for connecting the first data line DL1 to the green pixel G in the second column of the first row. The first data signal D1 supplied to the first data line DL1 may be supplied to a switching transistor Q in the second column of the first row via the second connection line BRL12 when a seventh gate signal (not shown) supplied to the seventh gate line GL7 is at on-level.

The blue pixel B disposed in the third column of the first row may be connected to the second data line DL2 and the seventh gate line GL7, and a switching transistor Q for driving the pixel in the third column of the first row may be disposed on the upper side of the pixel.

The white pixel W disposed across the first column to the third column of the second row may be connected to the first data line DL1 and the first gate line GL1, and a switching transistor Q of the pixel may be disposed on the left side of the first column of the second row.

In order to perform dot-inversion method on the super-pixels UP shown in FIG. 17, the waveforms of the first to fourth data signals D1 to D4 and the first to sixth gate signals G1 to G6 may be determined as described below.

Referring to FIG. 18, in the first time interval t1, the first gate signal G1 may have on-level voltage while the second to sixth gate signals G2 to G6 may have off-level voltage. At this time, the first and second data signals D1 and D2 may have positive polarity while the third and fourth data signals D3 and D4 may have negative polarity.

Subsequently, in the second time interval t2, the second gate signal G2 may have on-level voltage while the first and third to sixth gate signals G1 and G3 to G6 may have off-level voltage. At this time, the first and second data signals D1 and D2 may have positive polarity while the third and fourth data signals D3 and D4 may have negative polarity.

Subsequently, in the third time interval t3, the third gate signal G3 may have on-level voltage while the first, second and fourth to sixth gate signals G1, G2 and G4 to G6 may have off-level voltage. At this time, the first and second data signals D1 and D2 may have positive polarity while the third and fourth data signals D3 and D4 may have negative polarity.

Subsequently, in the fourth time interval t4, the fourth gate signal G4 may have on-level voltage while the first to third, fifth and sixth gate signals G1 to G3, G5 and G6 may have off-level voltage. At this time, the first and second data signals D1 and D2 may have positive polarity while the third and fourth data signals D3 and D4 may have negative polarity.

Subsequently, in the fifth time interval t5, the fifth gate signal G5 may have on-level voltage while the first to fourth and sixth gate signals G1 to G4 and G6 may have off-level voltage. At this time, the first and second data signals D1 and D2 may have positive polarity while the third and fourth data signals D3 and D4 may have negative polarity.

Subsequently, in the sixth time interval t6, the sixth gate signal G6 may have on-level voltage while the first to fifth gate signals G1 to G5 may have off-level voltage. At this time, the first and second data signals D1 and D2 may have positive polarity while the third and fourth data signals D3 and D4 may have negative polarity.

Based on the waveforms of the first to fourth data signals D1 to D4 and the first to sixth gate signals G1 to G6, as well as the connection between the gate lines GL, the data lines DL and the connection lines BRL according to the exemplary embodiment shown in FIG. 17, it is possible to perform dot-inversion method pixel by pixel. This allows for dot-inversion method on pixel-by-pixel basis, which are smaller units than the super-pixels shown in FIG. 7, thereby further improving the display quality.

Moreover, based on such connection, the first and fourth data signals D1 and D4 can remain at positive polarity in a frame, while the second and third data signals D2 and D3 can remain at negative polarity in a frame. Accordingly, the polarities of the data signals input to the respective data lines change frame by frame, and thus it is possible to perform column-inversion driving that changes the polarities of the data lines DL arranged in the row direction are changed frame by frame. That is, the column-inversion driving actually performed may be perceived as if the dot-inversion method was performed. As a result, the advantage of lower power consumption and cheaper driving IC obtained when the column-inversion driving is performed, as well as the advantage of high improvement of the display quality achieved when the dot-inversion method is performed, can be obtained.

Figure 20:
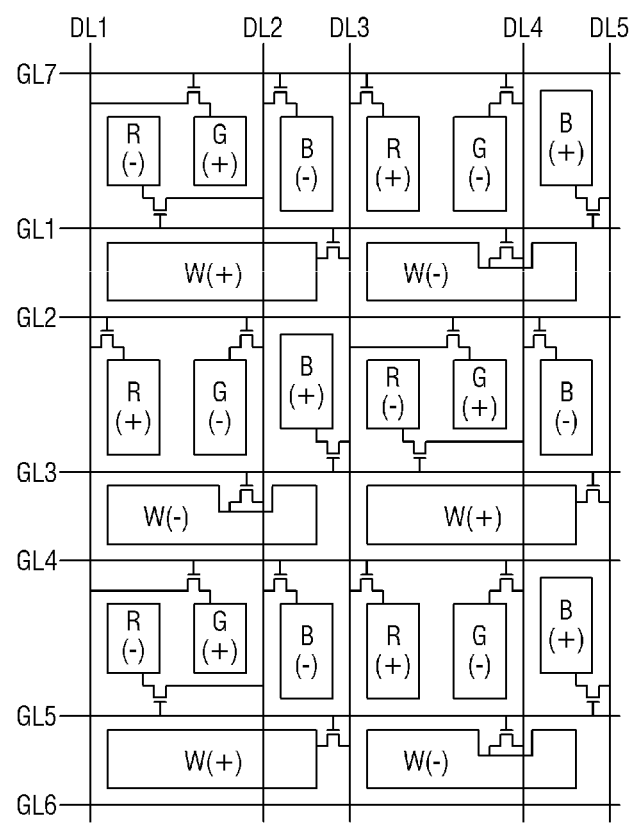
FIG. 20 is a diagram schematically showing connection between data lines and gate lines of the pixels shown in FIG. 5 according to another exemplary embodiment of the present disclosure.
Figure 21:
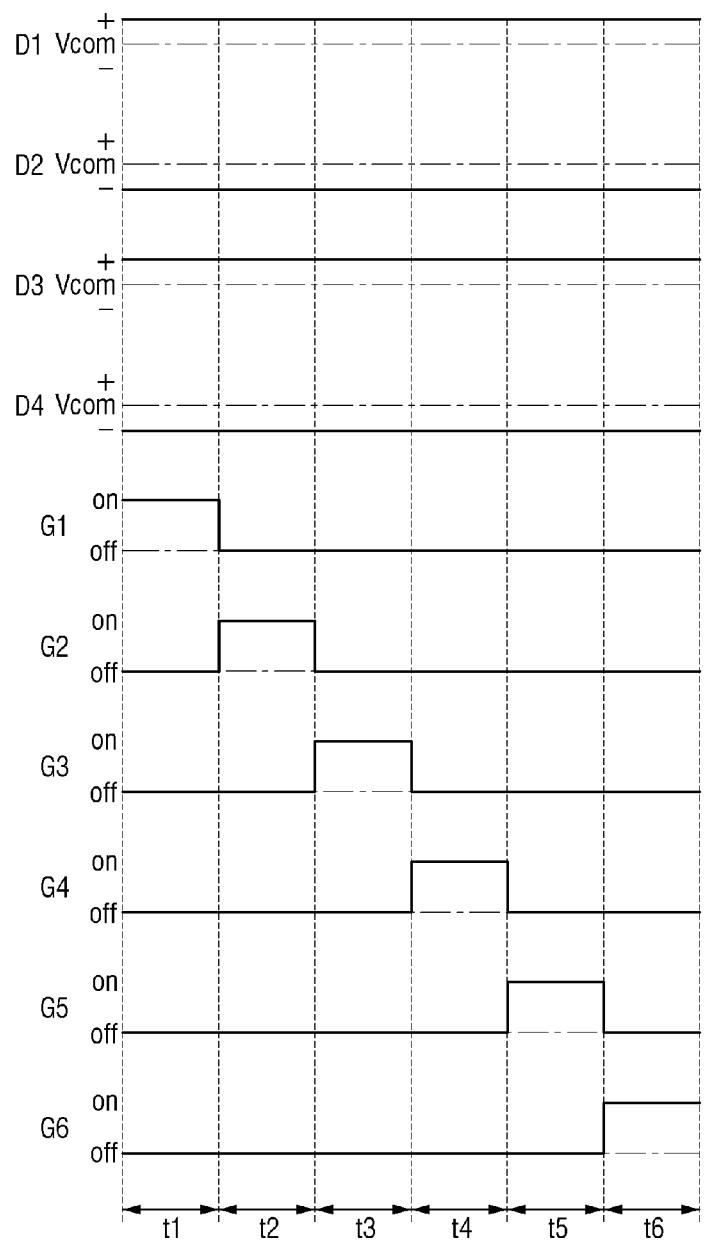
FIG. 21 shows a waveform diagram of signals input to the data lines and the gate lines shown in FIG. 20.

FIG. 20 is a diagram schematically showing connection between data lines and gate lines of the pixels shown in FIG. 5 according to another exemplary embodiment of the present disclosure. FIG. 21 shows a waveform diagram of signals input to the data lines and the gate lines shown in FIG. 20.

Referring to FIG. 20, unlike the exemplary embodiment shown in FIG. 17, a white pixel W disposed across the first column to the third column of the second row may be connected to a third data line DL3 and a first gate line GL1, and a switching transistor Q of the pixel may be disposed on the right side of the third column of the second row.

Referring to FIG. 21, in the first time interval t1, the first gate signal G1 may have on-level voltage while the second to sixth gate signals G2 to G6 may have off-level voltage. At this time, the first and second data signals D1 and D2 may have positive polarity while the third and fourth data signals D3 and D4 may have negative polarity.

Subsequently, in the second time interval t2, the second gate signal G2 may have on-level voltage while the first and third to sixth gate signals G1 and G3 to G6 may have off-level voltage. At this time, the first and third data signals D1 and D3 may have positive polarity while the second and fourth data signals D2 and D4 may have negative polarity.

Subsequently, in the third time interval t3, the third gate signal G3 may have on-level voltage while the first, second and fourth to sixth gate signals G1, G2 and G4 to G6 may have off-level voltage. At this time, the first and third data signals D1 and D3 may have positive polarity while the second and fourth data signals D2 and D4 may have negative polarity.

Subsequently, in the fourth time interval t4, the fourth gate signal G4 may have on-level voltage while the first to third, fifth and sixth gate signals G1 to G3, G5 and G6 may have off-level voltage. At this time, the first and third data signals D1 and D3 may have positive polarity while the second and fourth data signals D2 and D4 may have negative polarity.

Subsequently, in the fifth time interval t5, the fifth gate signal G5 may have on-level voltage while the first to fourth and sixth gate signals G1 to G4 and G6 may have off-level voltage. At this time, the first and third data signals D1 and D3 may have positive polarity while the second and fourth data signals D2 and D4 may have negative polarity.

Subsequently, in the sixth time interval t6, the sixth gate signal G6 may have on-level voltage while the first to fifth gate signals G1 to G5 may have off-level voltage. At this time, the first and third data signals D1 and D3 may have positive polarity while the second and fourth data signals D2 and D4 may have negative polarity.

Based on the waveforms of the first to fourth data signals D1 to D4 and the first to sixth gate signals G1 to G6, as well as the connection between the gate lines GL, the data lines DL and the connection lines BRL according to the exemplary embodiment shown in FIG. 20, it is possible to perform dot-inversion method pixel by pixel. According to this embodiment, however, unlike the exemplary embodiment shown in FIG. 17, the blue pixels B can also be dot-inversion driven pixel by pixel. As a result, the red pixels R, the green pixels G, the blue pixels B and the white pixels W can be individually dot-inversion driven.

Although preferred embodiments of the present inventive concept have been described for illustrative purposes, those skilled in the art will appreciate that various modifications, additions and substitutions are possible, without departing from the scope and spirit of the inventive concept as disclosed in the accompanying claims.

What is claimed is:

1. A liquid-crystal display (LCD) device comprising:
a plurality of super-pixels arranged in a first direction and a second direction intersecting the first direction, each of the plurality of super-pixels comprising:
a first pixel,
a second pixel adjacent to a first side of the first pixel in the first direction,
a third pixel adjacent to a first side of the second pixel in the first direction,
a fourth pixel adjacent to a first side of the first to third pixels in the second direction, and
a first data line and a second data line extending in the second direction,
wherein a width of the fourth pixel in the first direction is equal to a sum of widths of the first to third pixels in the first direction,
each of the first to fourth pixels is connected to one of the first data line and the second data line,
the first data line is disposed adjacent to a second side of the first pixel in the first direction, and
the second data line is disposed between the second pixel and the third pixel,
wherein the second pixel and the third pixel are connected to the second data line.

2. The LCD device of claim 1, further comprising:
a first gate line, a second gate line and a third gate line extending in the first direction; and
a third data line extending in the second direction,
wherein the first gate line is disposed adjacent to a second side of the first pixel in the second direction,
the second gate line is disposed between the first pixel and the fourth pixel,
the third gate line is disposed adjacent to a first side of the fourth pixel in the second direction, and
the third data line is disposed adjacent to a first side of the third pixel in the first direction.

3. The LCD device of claim 2, wherein a first gate line of a super-pixel corresponds to a third gate line of another super-pixel adjacent to the first gate line in the second direction, and
a third data line of a super-pixel corresponds to a first data line of another super-pixel adjacent to the third data line in the first direction.

4. The LCD device of claim 2, wherein the first pixel is connected to a respective first data line and a respective second gate line,
the second pixel is connected to the first gate line,
the third pixel is connected to the second gate line, and
the fourth pixel is connected to the first data line and a respective third gate line.

5. The LCD device of claim 4, wherein polarities of first to third data signals input to the first to third data lines, respectively, are changed frame by frame.

6. A liquid-crystal display (LCD) device comprising:
a plurality of super-pixels arranged in a first direction and a second direction intersecting the first direction, each of the plurality of super-pixels comprising:
a first pixel,
a second pixel adjacent to a first side of the first pixel in the first direction,
a third pixel adjacent to a first side of the second pixel in the first direction,
a fourth pixel adjacent to a first side of the first to third pixels in the second direction,
a first data line, a second data line and third data line extending in the second direction, and
a first gate line, a second gate line and a third gate line extending in the first direction,
wherein a width of the fourth pixel in the first direction is equal to a sum of widths of the first to third pixels in the first direction,
each of the first to fourth pixels is connected to one of the first data line and the second data line,
the first data line is disposed adjacent to a second side of the first pixel in the first direction,
the second data line is disposed between the first side of the second pixel and the third pixel,
wherein the first gate line is disposed adjacent to a second side of the first pixel in the second direction,
the second gate line is disposed between the first pixel and the fourth pixel,
the third gate line is disposed adjacent to a first side of the fourth pixel in the second direction,
the third data line is disposed adjacent to a first side of the third pixel in the first direction,
wherein the first pixel is connected to a respective second data line and a respective second gate line,
the second pixel is connected to a respective first data line and a first gate line,
the third pixel is connected to the second data line and the first gate line, and
the fourth pixel is connected to a respective third data line and the second gate line.

7. The LCD device of claim 6, wherein the first data line and the second pixel are connected to each other via a first connection line extending in the first direction, and
the second data line and the first pixel are connected to each other via a second connection line extending in the first direction.

8. The LCD device of claim 6, wherein polarities of first to third data signals input to the first to third data lines, respectively, remain the same in a frame.

9. A liquid-crystal display (LCD) device comprising:
a plurality of super-pixels arranged in a first direction and a second direction intersecting the first direction, each of the plurality of super-pixels comprising:
a first pixel,
a second pixel adjacent to a first side of the first pixel in the first direction,
a third pixel adjacent to a first side of the second pixel in the first direction,
a fourth pixel adjacent to a first side of the first to third pixels in the second direction; and
a first data line, and a second data line extending in the second direction,
wherein the second data line traverses the fourth pixel, wherein the fourth pixel comprises a fourth pixel electrode receiving a data signal from the first data line or the second data line connected thereto, wherein the fourth pixel electrode comprises a third domain comprising a plurality of slits making a third angle with respect to the straight line extending in the first direction, and a fourth domain comprising a plurality of slits forming a fourth angle with respect to the straight line, wherein the second data line comprises a first line section that overlaps the fourth pixel and a second line section other than the first line section, and wherein the first line section overlaps a boundary between the third domain and the fourth domain.

10. The LCD device of claim 9, wherein the first pixel comprises a first pixel electrode receiving a data signal from a first data line or a second data line connected thereto, and the first pixel electrode comprises a first domain comprising a plurality of slits making a first angle with respect to a straight line extending in the first direction, and a second domain comprising a plurality of slits making a second angle with respect to the straight line.

11. The LCD device of claim 10, wherein the first angle, the second angle, the third angle and the fourth angle are same.

12. The LCD device of claim 11, wherein initial orientations of alignment films disposed in the first to fourth domains are the same.

13. The LCD device of claim 10, wherein the first angle and the second angle are same, the third angle and the fourth angle are same and greater than the first angle and the second angle.

14. The LCD device of claim 13, wherein an initial orientation of the first domain is the same as that of the second domain, an initial orientation of the third domain is the same as that of the fourth domain, and the initial orientation of the first domain is different from that of the third domain.

15. The LCD device of claim 9, wherein a portion of each of the first and second data lines in a first domain extends in parallel to the slits of the first domain, and a portion of each of the first and second data lines in a second domain extends in parallel to the slits of the second domain.

16. The LCD device of claim 9, wherein the first pixel transmits light of a first wavelength band, the second pixel transmits light of a second wavelength band, the third pixel transmits light of a third wavelength band, and the fourth pixel transmits light of all wavelength bands.

* * * * *